(12) United States Patent  
Nishizawa et al.

(10) Patent No.: US 8,210,515 B2  
(45) Date of Patent: Jul. 3, 2012

(54) DOCUMENT TRANSPORT APPARATUS

(75) Inventors: Seiji Nishizawa, Chuo (JP); Yoichi Sakai, Fuefuki (JP); Masaki Omori, Kai (JP); Junya Nakajima, Minamiarupusu (JP)

(73) Assignee: Nisca Corporation, Minamikoma-Gun, Yamanashi-Ken (JP)

( * ) Notice: Subject to any disclaimer, the term of this patent is extended or adjusted under 35 U.S.C. 154(b) by 0 days.

(21) Appl. No.: 12/926,349

(22) Filed: Nov. 12, 2010

(65) Prior Publication Data

US 2011/0109038 A1 May 12, 2011

(30) Foreign Application Priority Data

Nov. 12, 2009 (JP) ................................ 2009-258782  
Dec. 29, 2009 (JP) ................................ 2009-299179  
Feb. 25, 2010 (JP) ................................ 2010-040877  
Feb. 25, 2010 (JP) ................................ 2010-040880  
Feb. 26, 2010 (JP) ................................ 2010-043287

(51) Int. Cl.
- *B65H 5/22* (2006.01)
- *B65H 83/00* (2006.01)
- *B65H 85/00* (2006.01)
- *B65H 29/66* (2006.01)
- *B65H 39/10* (2006.01)

(52) U.S. Cl. ...... 271/3.14; 271/3.19; 271/291; 271/301; 271/65; 271/186

(58) Field of Classification Search .................. 271/3.14, 271/3.19, 3.2, 291, 301, 65, 186; 399/368, 399/374, 401

See application file for complete search history.

(56) References Cited

U.S. PATENT DOCUMENTS

| | | | | |
|---|---|---|---|---|
| 6,393,251 | B2 * | 5/2002 | Kono | 399/370 |
| 6,522,860 | B2 * | 2/2003 | Nose et al. | 399/374 |
| 7,533,882 | B2 * | 5/2009 | Song | 271/186 |
| 7,954,806 | B2 * | 6/2011 | Saito | 271/65 |
| 2001/0014234 | A1 * | 8/2001 | Kono | 399/370 |
| 2008/0067736 | A1 * | 3/2008 | Tsai et al. | 271/186 |

FOREIGN PATENT DOCUMENTS

| | | |
|---|---|---|
| JP | 2002-111956 | 4/2002 |
| JP | 2004-175460 | 6/2004 |
| JP | 2004-233451 | 8/2004 |
| JP | 2005-289565 | 10/2005 |
| JP | 2006-327728 | 12/2006 |
| JP | 2007-051011 | 3/2007 |

\* cited by examiner

*Primary Examiner* — David H Bollinger  
(74) *Attorney, Agent, or Firm* — Manabu Kanesaka

(57) ABSTRACT

A document transport apparatus for transporting a document sheet to a predetermined position that includes a first switchback portion for switching back each of the document sheets of which the front side is read in the document reading portion to transport to the document reading portion and a second switchback portion for switching back each of the document sheets of which both sides are read in the document reading portion to discharge to the sheet discharge tray. The first switchback member provided in the first switchback portion transports two document sheets in mutually different directions and the first switchback member has a first switchback path and a first switchback roller pair each for guiding overlapping two document sheets in the mutually different directions or the same direction. The second switchback member provided in the second switchback portion transports two document sheets in mutually different directions.

11 Claims, 26 Drawing Sheets

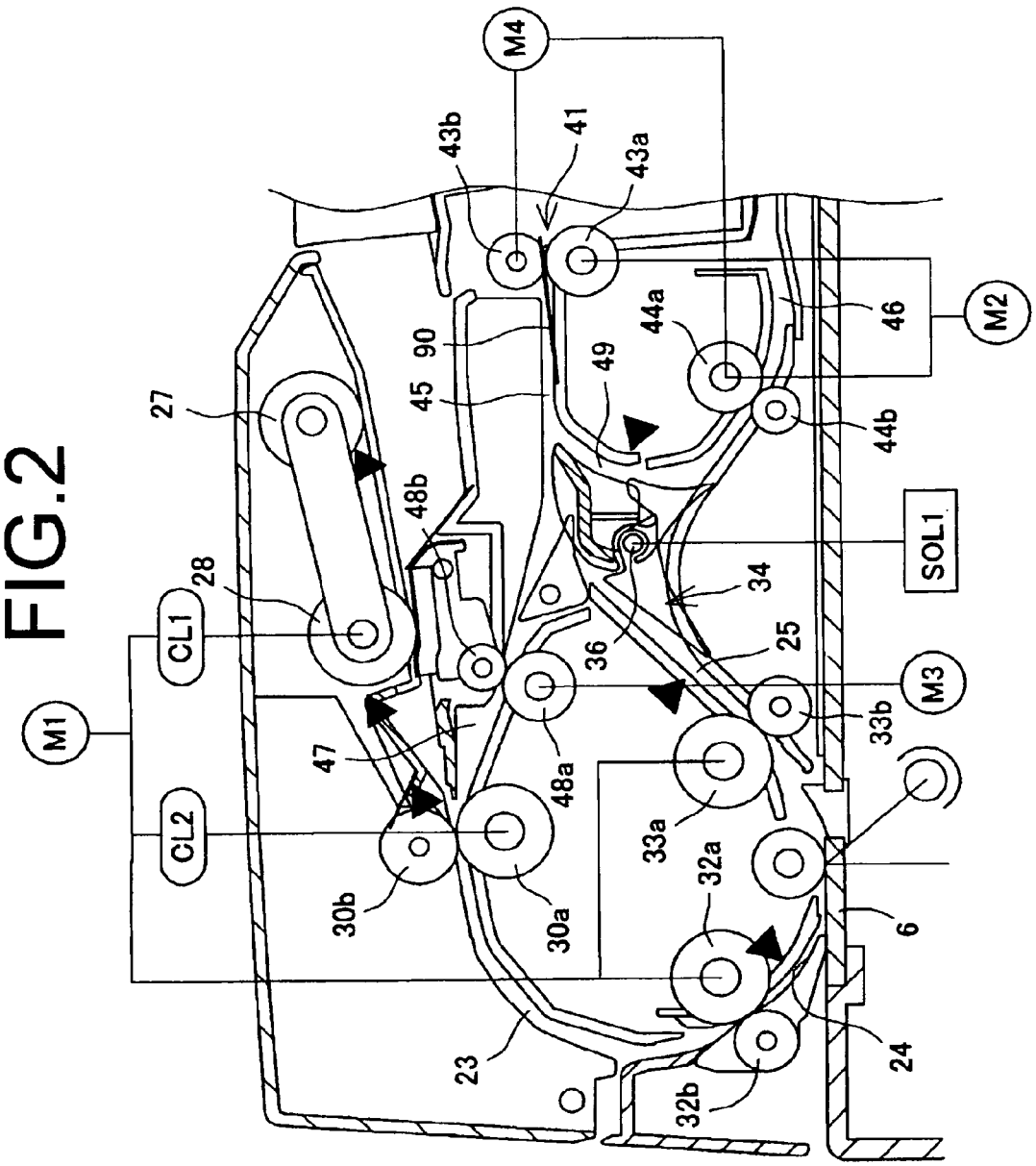

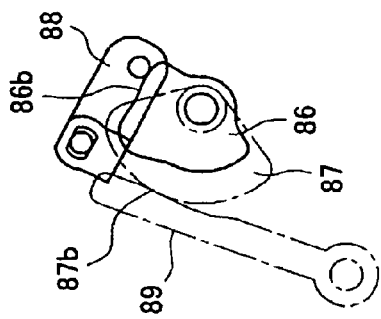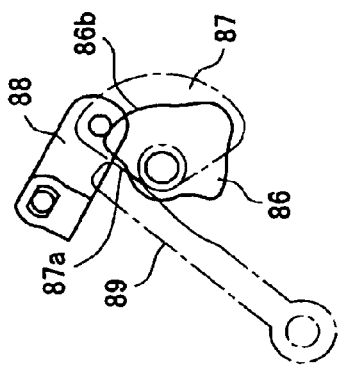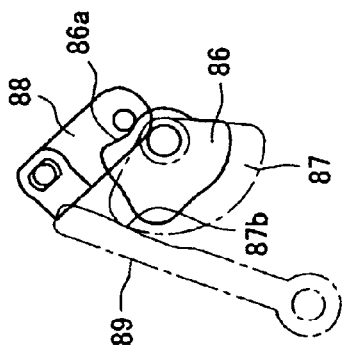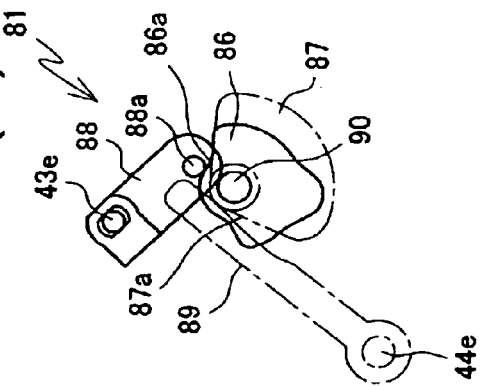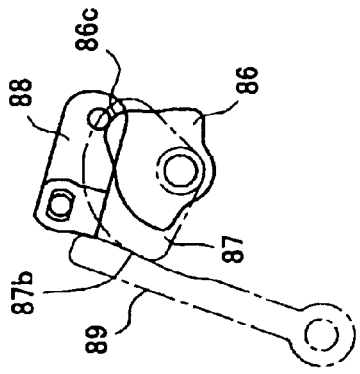

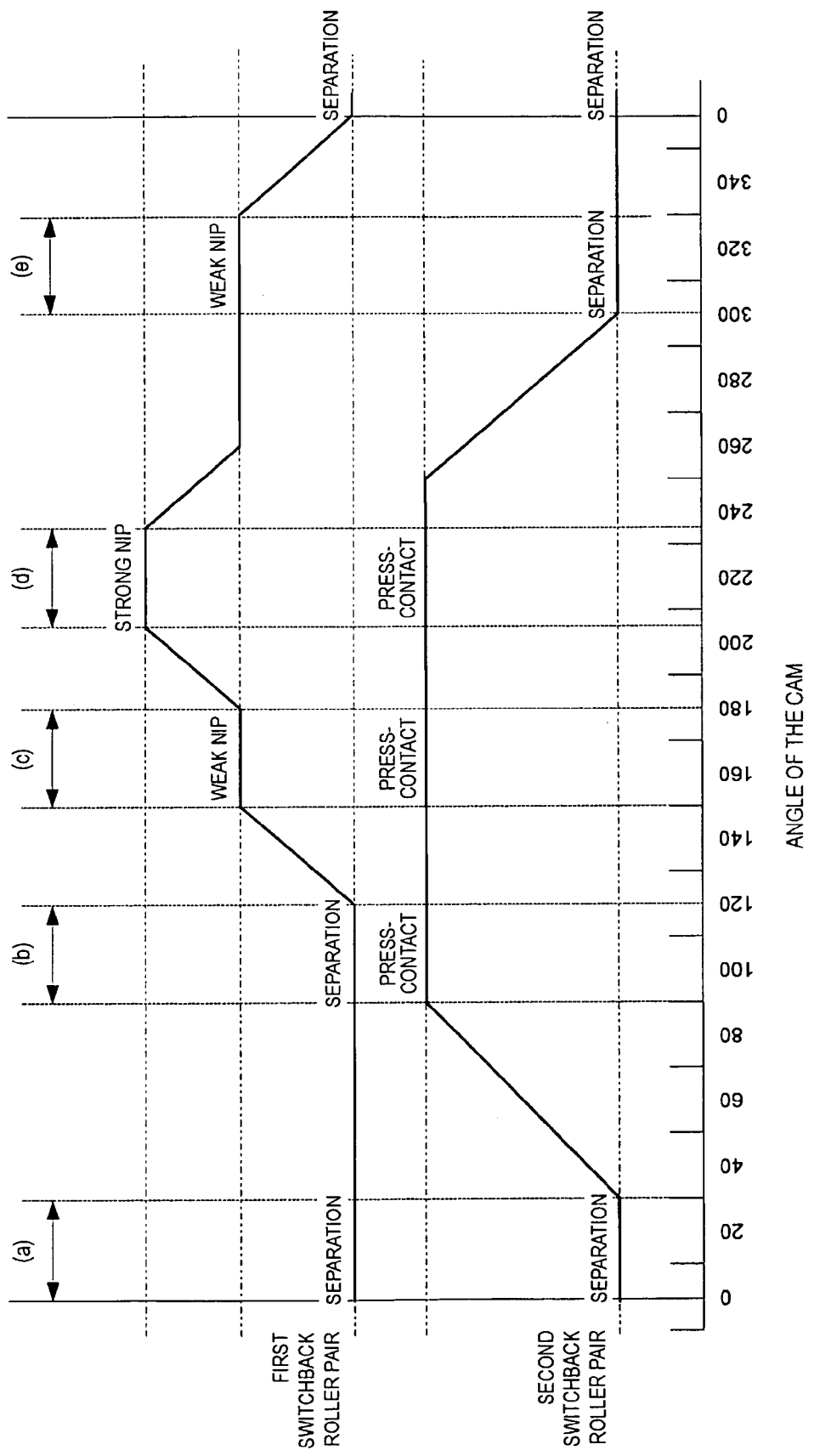

FIG.14
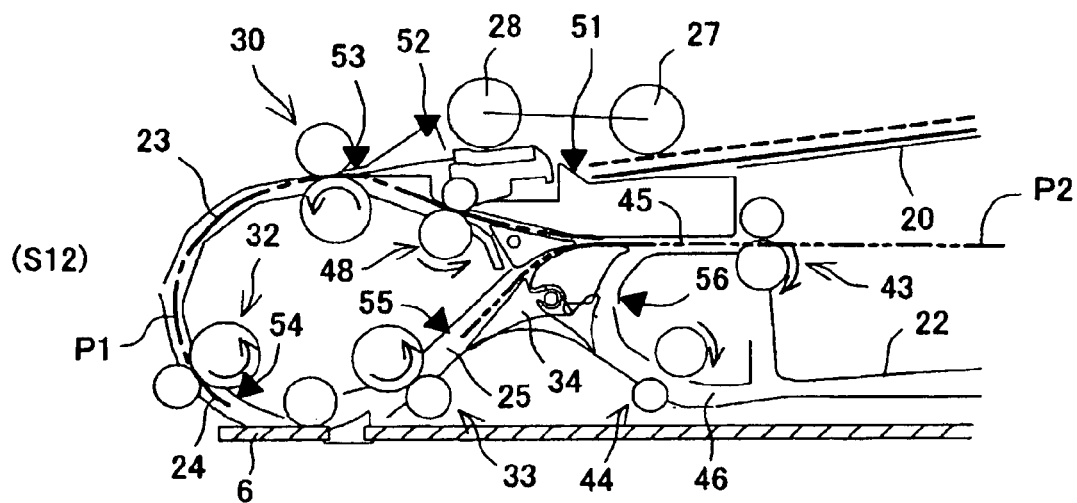
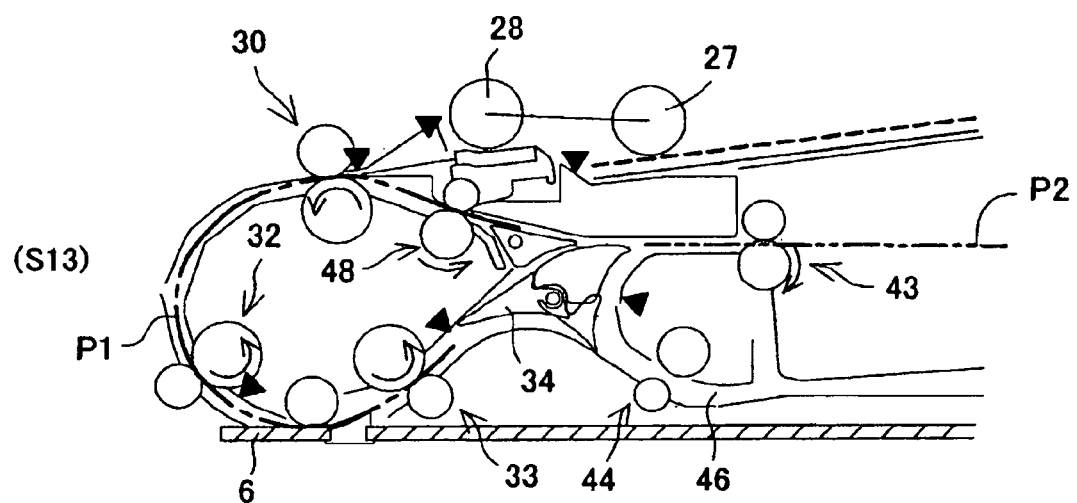

FIG. 16
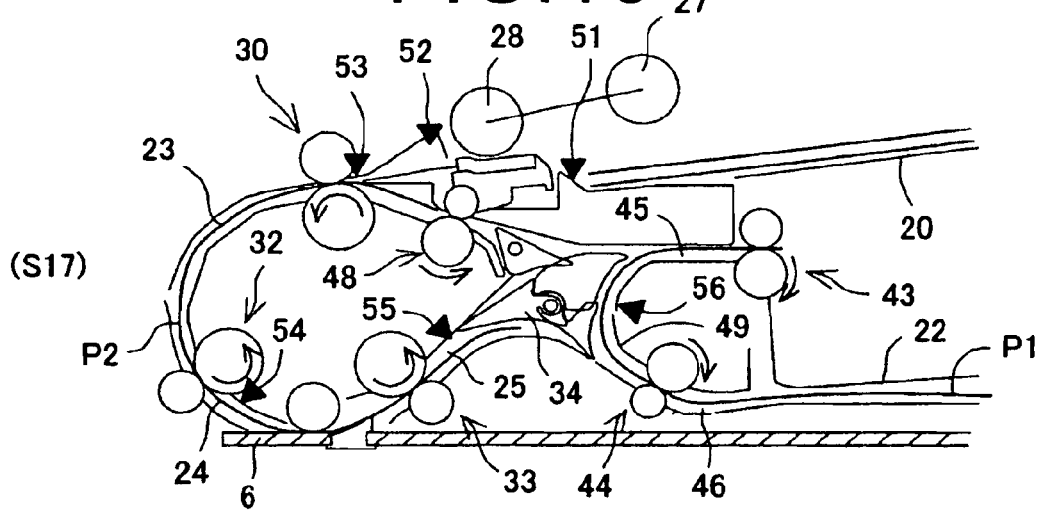
(S17)
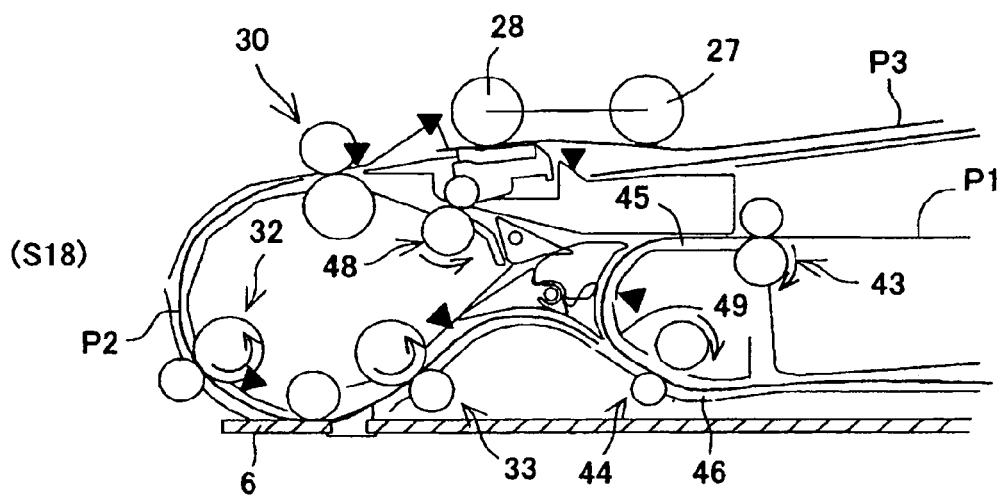
(S18)
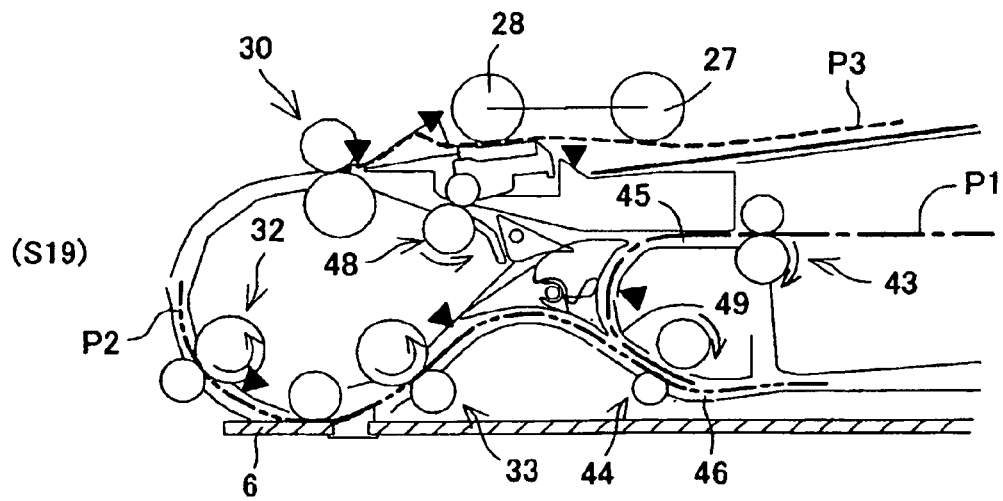
(S19)

FIG.17
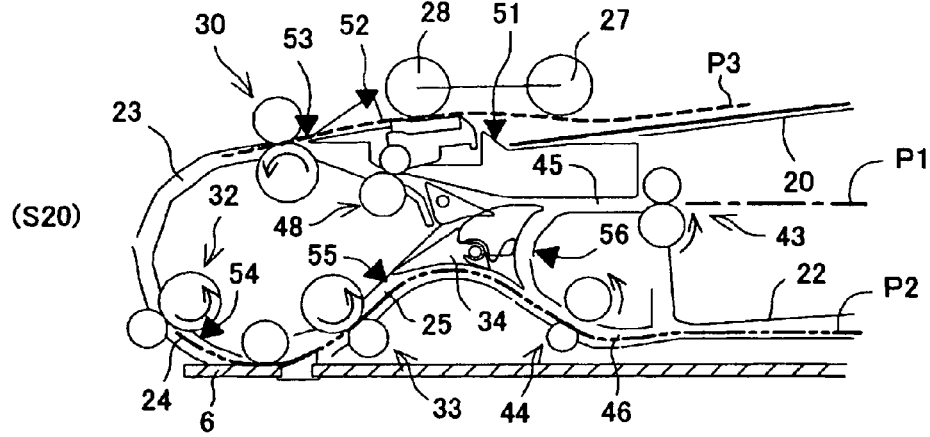
(S20)
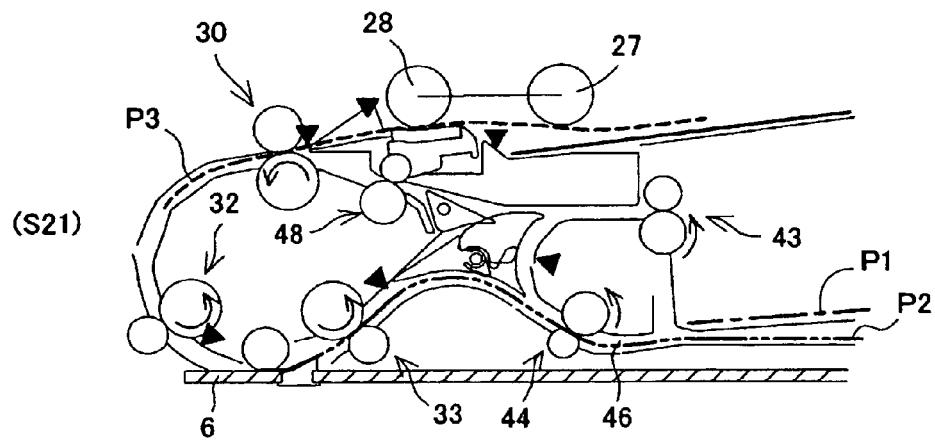
(S21)
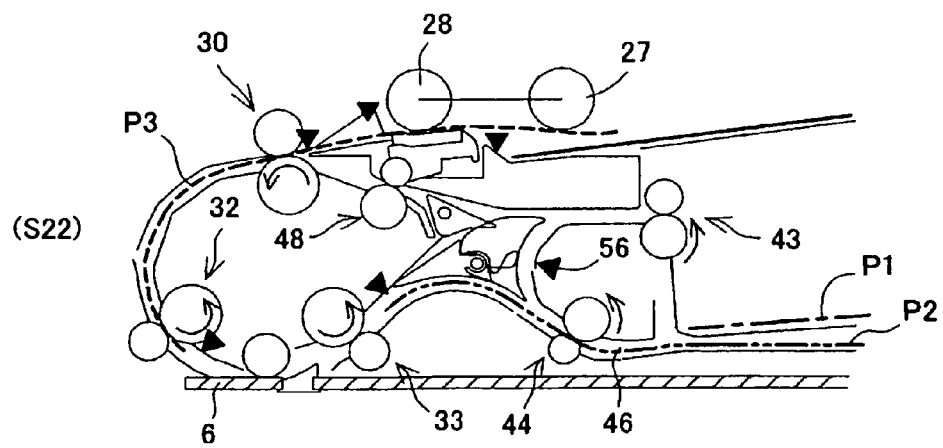
(S22)

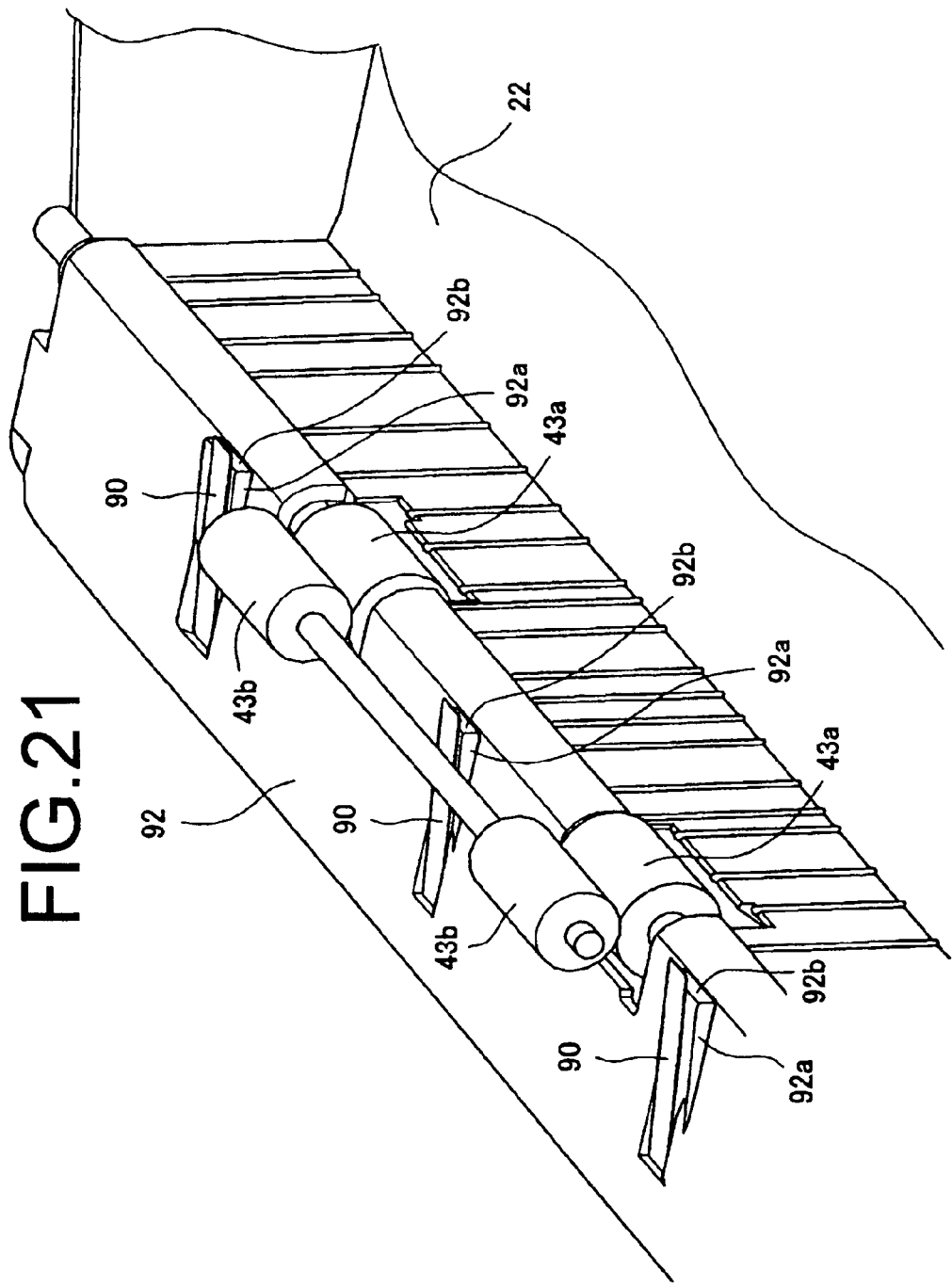

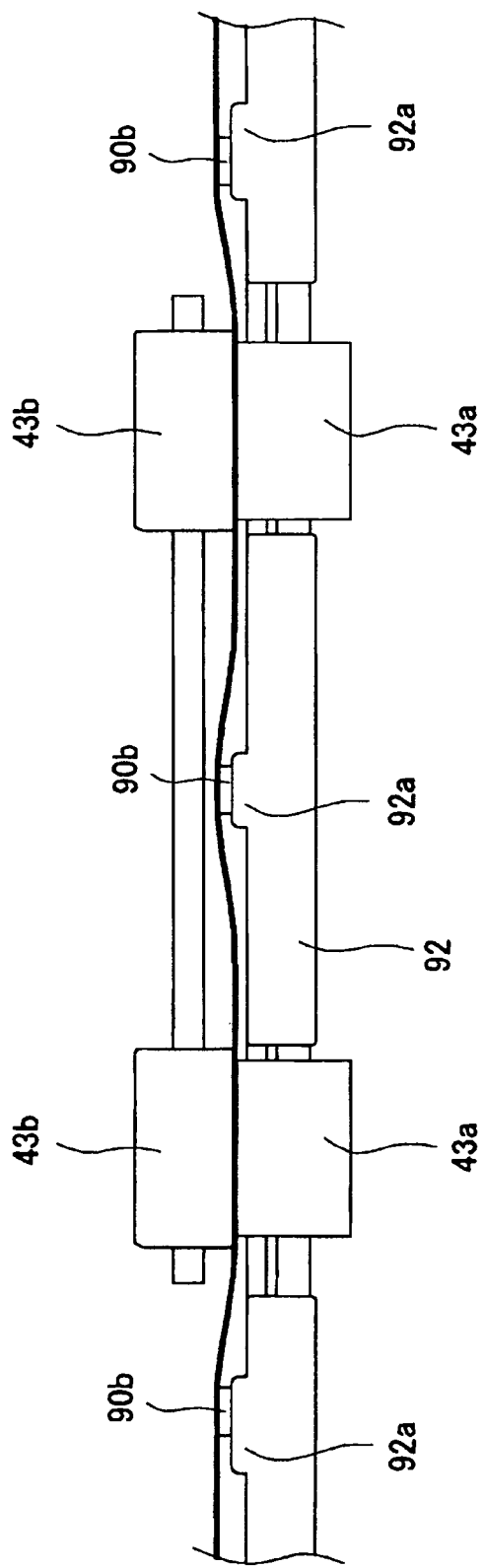

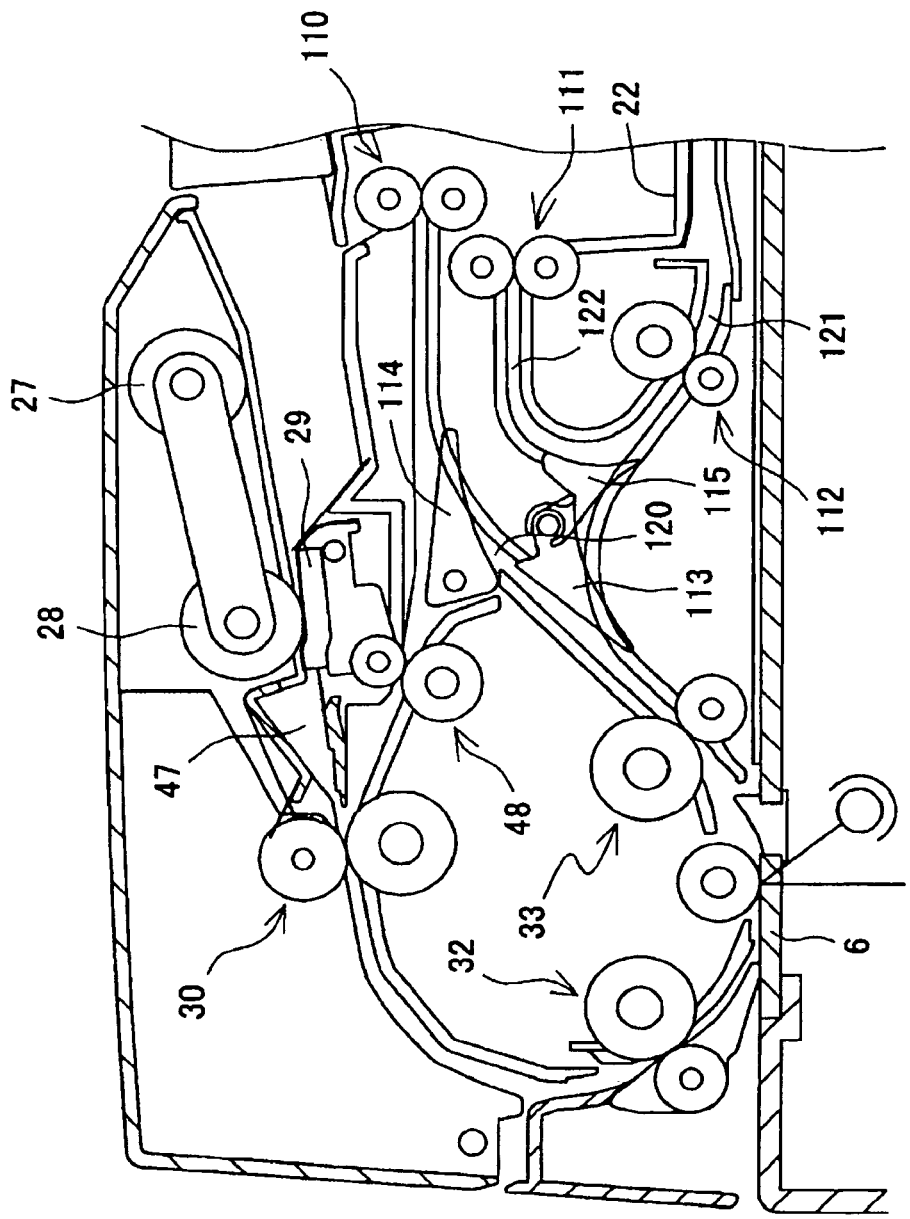

DOCUMENT TRANSPORT APPARATUS

RELATED APPLICATIONS

The present application is based on, and claims priority from Japanese Applications No. 2009-258782 filed Nov. 12, 2009; No. 2009-299179 filed Dec. 29, 2009; No. 2010-040877 filed Feb. 25, 2010; No. 2010-040880 filed Feb. 25, 2010 and No. 2010-043287 filed Feb. 26, 2010, the disclosure of which is hereby incorporated by reference herein in its entirety.

BACKGROUND OF THE INVENTION

1. Field of the Invention

The present invention relates to a document transport apparatus for transporting a document sheet to a predetermined processing position to read the document sheet, and more particularly, to a document transport mechanism for reversing the side of a document sheet of which one side is read again to a read position to read both side of the document sheet, and collating document sheets of which both sides are read to discharge.

In recent years, for a document transport apparatus mounted on an image reading apparatus, various path configurations and document feeding procedures have been proposed to reduce the reading time in reading both sides of document sheets.

2. Description of the Related Art

In recent years, for a document transport apparatus mounted on an image reading apparatuses, various path configurations and document feeding procedures have been proposed to reduce the reading time in reading both sides of document sheets. As one of the document transport apparatus, a plurality of switchback paths is provided on the downstream side of contact glass having a read position to read the document sheets.

In this type of apparatus, there is an apparatus in which a first document sheet of which the front side is read in a read position is switched back in a first switchback path, a second document sheet is switched back in a second switchback path, the switched-back document sheet is fed again to the read position to read the back side, and the document sheet of which both sides are read is switched back in a switchback path for discharge, then reversed, and discharged from a discharge path that is also used as the second switchback path (for example, Japanese Patent Application Publication No. 2005-289565).

Further, another apparatus has been known where a document sheet of which the front side is read in a read position is switched back in a switchback path for re-feeding, then reversed, and fed again to the read position to read the back side, and the document sheet of which both sides are read is switched back in a switchback path for discharge, and is discharged from the discharge path used also as the switchback path for re-feeding (for example, Japanese Patent Application Publication No. 2006-327728).

Then, in these apparatuses, reading efficiency of two-sided document sheets is improved by controlling transport so as to transport the front side of a first document sheet, the front side of a second document sheet, the back side of the first document sheet, the baCk side of the second document sheet, the front side of a third document sheet, the front side of a fourth document sheet, the back side of the third document sheet, the back side of the fourth document sheet, ... to the read position in this order in reading the two-sided document sheets.

However, since the former apparatus is comprised of the first, second and discharge switchback paths, the configuration is complicated, and the apparatus becomes large. Further, in the second switchback path also used as the discharge path, unless the second document sheet to be switched back is carried out of the path, the first document sheet cannot be discharged. In the discharge switchback path, unless the first document sheet is discharged, the second document sheet cannot be carried in the path.

In the latter apparatus, in each of the switchback path for re-feeding and the discharge switchback path, unless a first document sheet is carried out of the path, a second document sheet cannot be carried in the path. Further, in the switchback path for re-feeding, since this path is also used as the discharge path, unless the second document sheet is discharged, a third document sheet cannot be carried in the path. Furthermore, for large-size document sheets, transport is controlled so as to read the front side of a first sheet, the back side of the first sheet, the front side of a second sheet, the back side of the second sheet, . . . , and therefore, the processing time significantly increases in reading the large-size document sheets.

In other words, there are problems that the apparatus becomes complicated and large in the former apparatus, and that the processing time significantly increases in reading large-size document sheets in the latter apparatus. Further, in both of the former and latter apparatuses, the configuration and transport operation of document sheets is controlled so that an only single document sheet exits in each of a plurality of switchback paths, and there are limitations in further reducing the reading processing time of document sheets and improving productivity.

It is an object of the invention to provide a document transport apparatus for further reducing the processing time to read both sides of document sheets, and improving productivity in two-sided document sheets.

SUMMARY OF THE INVENTION

In the invention, a document transport apparatus for transporting a document sheet to a predetermined position to read the document sheet is provided with a transport means for transporting document sheets on a paper feed tray to a document reading portion, a first switchback portion for switching back the document sheet of which the front side is read in the document reading portion to transport again to the document reading portion, a second switchback portion for switching back the document sheet of which both sides are read in the document reading portion to discharge to a sheet discharge tray, and first and second switchback means for transporting document sheets in the mutually different directions in the first and second switchback portions, respectively.

BRIEF DESCRIPTION OF THE DRAWINGS

FIG. 2 is an enlarged cross-sectional view showing a principal part of the document transport apparatus;

FIGS. 7(a)-7(e) contains state views showing the press-contact state of the first and second cams and first and second arms;

FIG. 8 is a chart diagram illustrating the relationship between the rotation angles of the first and second cams and press-contact/separate state of the first and second switchback roller pairs;

FIG. 14 contains schematic views illustrating the document transport operation of two-sided document sheets continued from FIG. 13;

FIG. 16 contains schematic views illustrating the document transport operation of two-sided document sheets continued from FIG. 15;

FIG. 17 contains schematic views illustrating the document transport operation of two-sided document sheets continued from FIG. 16;

FIG. 21 is a perspective view showing the configuration of the first switchback portion provided with the elastic film member for peeling;

FIG. 22 is a state view showing a state for providing a document sheet with strength in the first switchback portion provided with the elastic film member for peeling;

FIG. 25 is an enlarged cross-sectional view showing a principal part in another embodiment.

DESCRIPTION OF THE PREFERRED EMBODIMENTS

Figure 1:
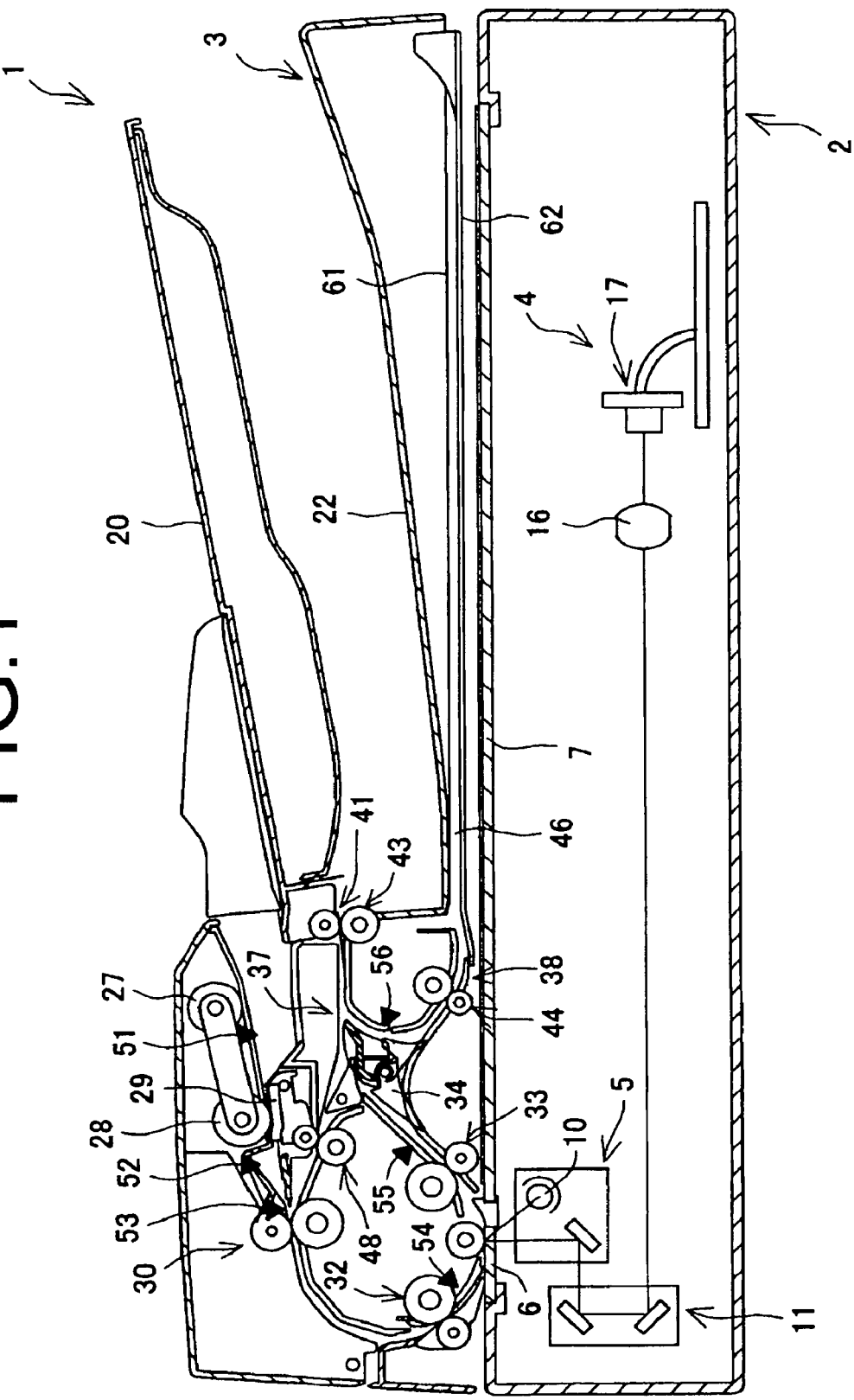
FIG. 1 is a cross-sectional view showing the entire configuration of a document reading apparatus provided with a document transport apparatus.

FIG. 1 is a cross-sectional view showing configurations of a document transport apparatus 3 of the invention and an image formation apparatus 2 on which the document transport apparatus 3 is mounted to enable the apparatus 3 to be opened and closed, and FIG. 2 is an enlarged cross-sectional view showing a principal part of the document transport apparatus. Embodiments of the document transport apparatus according to the invention will specifically be described below based on accompanying drawings.

As shown in FIG. 1, a document reading apparatus 1 of the invention is comprised of a reading apparatus main body 2 having an image reading section 4, and the document transport apparatus 3 that is attached above the document reading apparatus main body 2. The document transport apparatus 3 is attached to be capable of being opened and closed with respect to an upper surface of the document reading apparatus main body 2 using a hinge (not shown in the figure), to mount a document on contact glass 7.

The image reading section 4 reads a document sheet passing through an upper surface of first contact glass 6 with an optical section 5 fixed. Further, on the upper surface of the document reading apparatus main body 2 is provided second contact glass 7 having square space to mount a document, and the document set on the contact glass 7 can be read by the optical section 5 of the image reading section 4 traveling.

The image reading section 4 is comprised of a light source such as a lamp, a plurality of mirrors 11, lens 16, photoelectric conversion element 17 such as a CCD, etc. The document that is transported or mounted is irradiated with light emitted from the light source 10 through the first contact glass 6 or the second contact glass 7. Then, the light that is applied to the document surface and reflected is reflected several times by a plurality of mirrors 11, and then, is subjected to photoelectric conversion by the photoelectric conversion element 17 via the lens 16, and the image of the document is read.

The configuration of the document transport apparatus 3 will be described next. As shown in FIGS. 1 and 2, the document transport apparatus 3 is provided with a paper feed tray 20 capable of being mounted with a plurality of document sheets, and a sheet discharge tray 22 for storing document sheets on which the reading processing is finished.

Further, the document transport apparatus 3 is provided with a document transport path comprised of a paper feed path 23 for feeding a sheet on a sheet-by-sheet basis from a plurality of document sheets mounted on the paper feed tray 20, a read path 24 extending from the paper feed path 23 through the first contact glass 6, and a sheet discharge path 25 continuing from the read path 24 to a sheet discharge outlet of the sheet discharge tray 22.

On the downstream side of the paper feed tray 20 are provided a feed-out roller 27 coming into contact with the document sheets on the paper feed tray to feed out, a paper feed roller 28 for feeding the fed-out sheet, a separation pad 29 coming into contact with the paper feed roller 28 to separate the sheets on a sheet-by-sheet basis, and a register roller pair 30 for striking and aligning a front end of the document sheet that is separated and fed on a sheet-by-sheet basis, and then sending the sheet toward the first contact glass 6. On the read transport path 24 are provided a first read roller pair 32 arranged on the upstream side of the first contact glass 6, and a second read roller pair 33 arranged on the downstream side. In addition, the register roller pair 30 is comprised of a driving roller 30a and driven roller 30b. The first read roller pair 32 is comprised of a driving roller 32a and driven roller 32b, and the second read roller pair 33 is comprised of a driving roller 33a and driven roller 33b.

Further, on the downstream side of the read path 24 are provided a first switchback portion 37 for switching back a document sheet of which one side (front side) is read to feed again to the first contact glass 6, and a second switchback portion 38 for switching back a document sheet of which both front and back sides are read, reversing the side, and storing the sheet in the sheet discharge tray 22. The first switchback portion 37 has a first switchback path 45 used also as the sheet discharge path 25, and a re-transport path 47 merging toward the register roller pair 30 from the upstream side of the first switchback path 45.

A first switchback roller pair 43 is provided at an end portion of the first switchback path 45, and on the re-transport path 47 is provided a standby roller pair 48 comprised of a driving roller 48a and driven roller 48b. The first switchback roller pair 43 has the function of switching back a document sheet to transport from the first switchback path 45 to the re-transport path 47, while discharging a document sheet onto the sheet discharge tray 22. In other words, the roller pair 43 also serves the function of a sheet discharge roller pair for discharging a document sheet on the sheet discharge tray 22. Further, the first switchback roller pair 43 is comprised of rollers capable of coming into contact with each other and separating from each other, in which one of the rollers is a driving roller 43a capable of rotating forward and backward and the other one is a driven roller 43b rotating freely.

In the press-contact and separation of the first switchback roller pair 43, the driven roller 43b is capable of swinging with respect to the driving roller 43a, and by separation/contact switching means 81 described later, it is possible to make separation, weak nip and strong nip. In addition, the weak nip is a state in which the press-contact force between the driving roller 43a and driven roller 43b is reduced, and the strong nip is a state in which the press-contact force between the driving roller 43a and driven roller 43b is higher than the press-contact force of the weak nip.

In the second switchback portion 38 are provided a second switchback path 46 extending from the second read roller pair 33 to in between the second contact glass 7 and sheet discharge tray 22, a reverse sheet discharge path 49 from the second switchback path 46 to reverse the document sheet while merging with the sheet discharge path 25, and a second switchback roller pair 44 for switching back a document sheet in the second switchback path 46 to feed to the reverse sheet discharge path 49. The second switchback roller pair 44 is comprised of rollers, where one of the rollers is a driving roller 44a. capable of rotating forward and backward, the other one is a driven roller 44a, and the driving roller 44a is capable of separating from and coming into contact with the driven roller 44b by the separation/contact switching means 81. In addition, the press-contact force of the second switchback roller pair 44 is set at almost the same as the press-contact force of the weak nip of the first switchback roller pair 43.

On the downstream side of the second read roller pair 33 is provided a switching means for switching the flow of a document sheet alternately toward either of the first switchback path 45 or the second switchback path corresponding to the document read process. The switching means is comprised of a switching flapper 34 having three-direction path surfaces that are rotatable on the rotary shaft 36. In the switching flapper 34, each path surface is rotatable in the range of a thickness width of a document sheet. The first path surface 34a is provided to guide a document sheet to the first switchback portion 41, the second path surface 34b is provided to guide a document sheet to the second switchback portion 42, and the third path surface 34c is provided to guide a document sheet to the sheet discharge tray 22.

Figure 3A:
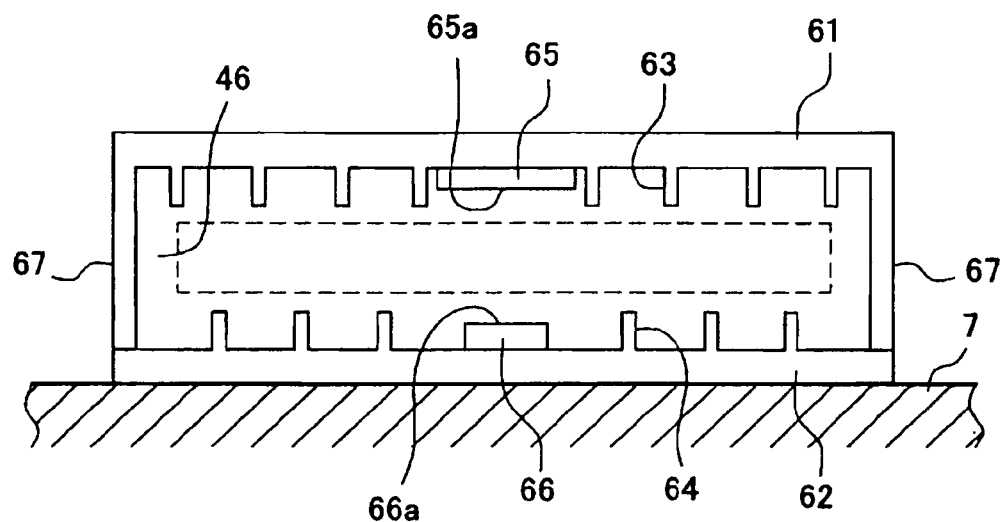
FIGS. 3(a) and 3(b) contains cross-sectional views showing a state of a second switchback path.
Figure 3B:
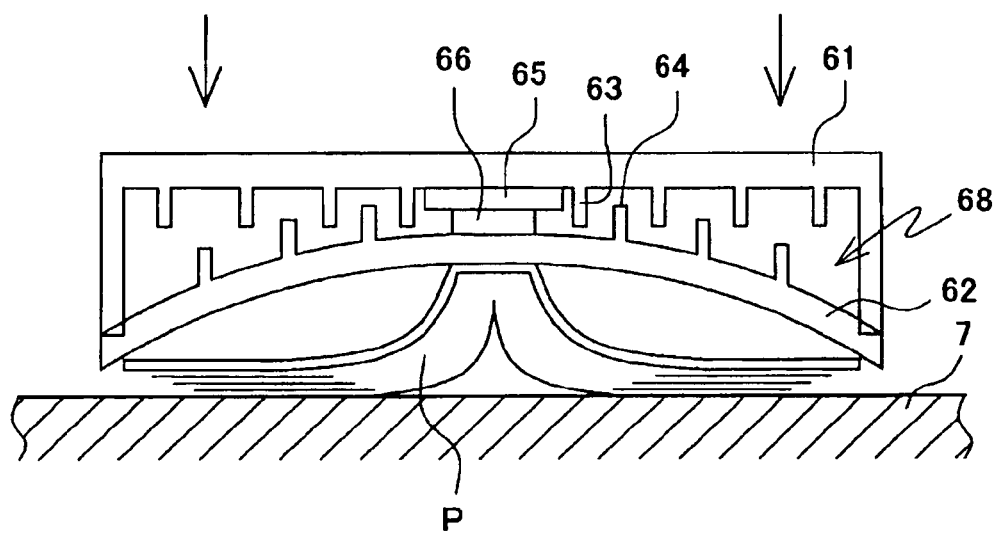

Herein, the second switchback path will specifically be described. As shown in FIG. 1, the second switchback path 46 is formed by an upper guide plate 61 and a lower guide plate 62 each provided below the sheet discharge tray 22. The lower guide plate 62 is configured to open the second switchback path 46 to remove a document sheet jammed inside the second switchback path 46. Further, as shown in FIG. 3, in the outer end portion of the upper guide plate 61, spacer pieces 67 protruding downward are provided in at least two portions, and by the spacer pieces 67 coming into contact with the upper surface of the lower guide plate 62, the second switchback path 46 is reserved. Furthermore, in the lower surface of the upper guide plate 61 are provided a plurality of upper transport ribs 63, extending to the downstream side in the sheet transport direction, coming into contact with the upper surface of the document sheet to guide transport of the document sheet, and a rectangular upper protrusion portion 65 lower than the protrusion height of the upper transport ribs 63 in the center portion. Meanwhile, in the lower guide plate 62 are provided a plurality of lower transport ribs 64, extending in parallel, coming into contact with the lower surface of the document sheet to guide transport, and a rectangular lower protrusion portion 66 lower than the protrusion height of the lower transport ribs 64 in the center portion.

FIG. 3(*a*) shows a section of the second switchback path 46 in a state in which a document sheet automatically fed from the paper feed tray 20 is transported. The upper transport ribs 63 and lower transport ribs 64 protruding to inside the second switchback path 46 are staggered not to oppose in the vertical direction, and the space to pass through a single document sheet is formed between front end portions of the ribs. In addition, the upper transport ribs 63 and lower transport ribs 64 are integrally formed in the upper guide plate 61 and the lower guide plate 62 using resin materials, respectively.

FIG. 3(*b*) shows a section of the second switchback path 46 in mounting a thick document P such as a book on the second platen 7 to read. When the thick document P such as a book is pressed by the document transport apparatus 3, there is a case that the lower guide plate 62 of the second switchback path 46 becomes distorted and deformed by the thickness of the document P. In this case, by top portions 65a, 66a of the upper protrusion portion 65 and lower protrusion portion 66 coming into contact with each other, it is possible to control the deformation amount to within a predetermined range so that the distortion deformation in the center portion of the lower guide plate 62 does not become larger. By this means, the lower guide plate 62 is prevented from becoming deformed with time, and the second switchback path 46 is thereby prevented from not reserving the sufficient transport space.

As shown in FIG. 3(*b*), the upper protrusion portion 65 and lower protrusion portion 66 are provided to oppose each other in the substantially center portions of the upper and lower guide plates 61, 62, it is thereby possible to suppress the deformation amount of the lower guide plate 62, and concurrently therewith, since respective top portions 65a, 66a of the portions 65, 66 are flat surfaces, it is possible to disperse the impact caused by contact. Further, since both of the top portions 65a, 66a are positioned inside the front ends of the transport ribs 63, 64 not to protrude from the front ends of the upper and lower transport ribs 63, 64, transport of the document sheet passing through document pass space 68 is not interfered in performing read transport. To absorb a collision caused by deformation of the lower guide plate 62, the upper and lower protrusion portions 65, 66 are preferably made of resin materials having appropriate flexibility while having hardness to some extent that the shape is not changed. In addition, it is not necessary that both of the upper and lower protrusion portions have the same hardness, and it is essential that one of the portions is hard while the other one has flexibility. Further, it is also possible to coat one or both of the top portions 65a, 66a with a thin protective sheet absorbing the impact to form the portions. In addition, the upper and lower protrusion portions 65, 66 may be formed by bonding the portions formed in accordance with the size of the upper and lower guide plates 61, 62 and the height of the upper and lower transport ribs 63, 64 using an adhesive and the like, or may be formed integrally in the upper and lower guide plates 61, 62.

Further, the upper transport ribs 63 and lower transport ribs 64 are staggered not to oppose one another in the vertical direction, and it is thereby possible to prevent collisions from occurring when the lower guide plate 62 becomes deformed, and further prevent occurrence of breakage and the like. Therefore, the transport is not interfered in the document sheet passing through the document pass space 68.

Figure 4:
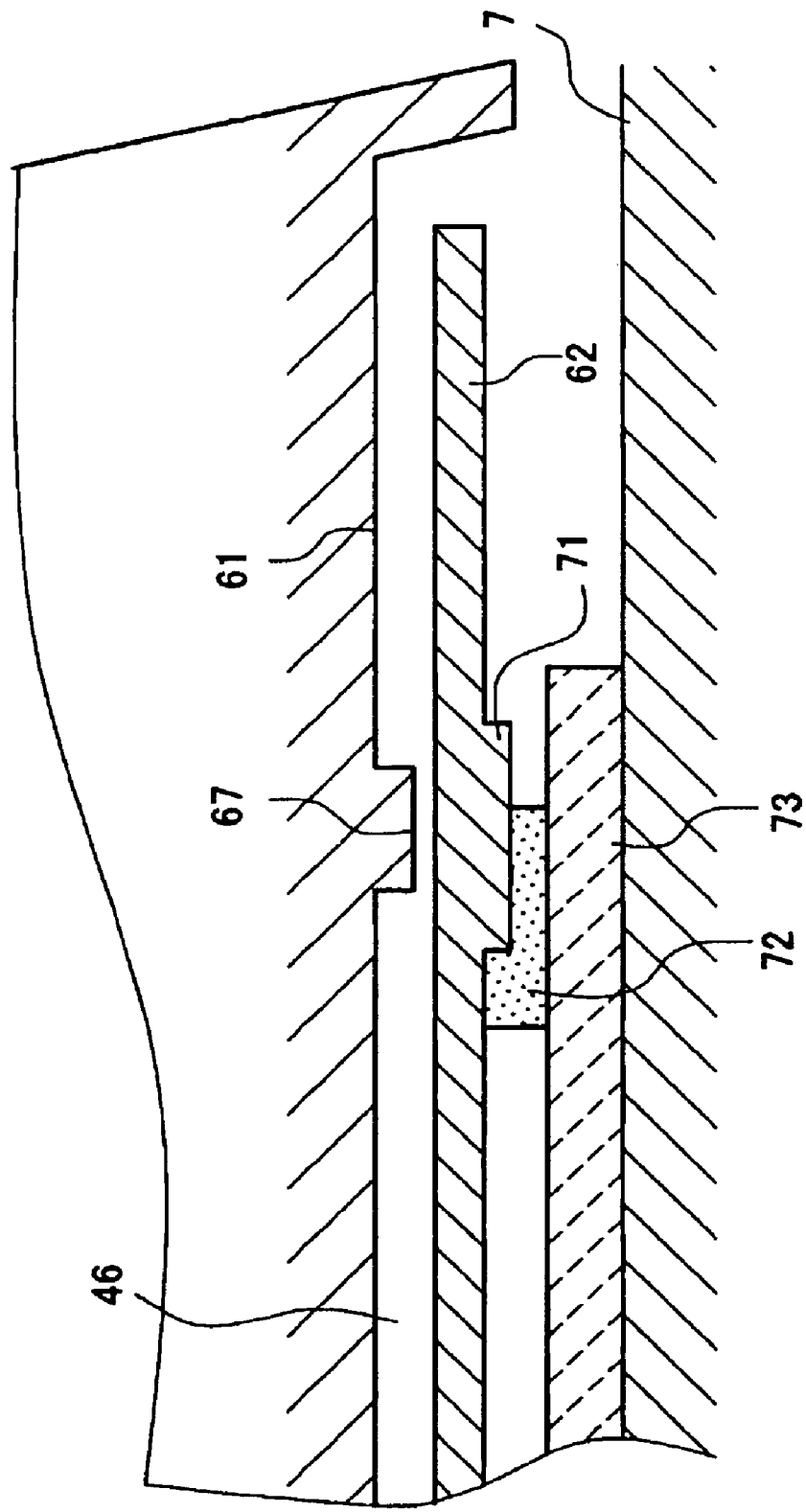
FIG. 4 is a cross-sectional view showing a structure of an end portion of the second switchback path.

FIG. 4 shows a cross-sectional structure of the end portion of the second switchback path 46. Generally, a document press plate 73 for pressing a fixed document mounted on the platen 7 is provided on the back side of the lower guide plate 62 of the second switchback path 46 via a sponge member 72. As the document press plate 73, a thin white resin plate is used which has substantially the same shape and size as those of the lower guide plate 62. The sponge member 72 is to bond the document press plate 73 to the lower guide plate 62 while providing the plate 73 with a cushion against the plate 62, and is provided in at least four corners of the lower guide plate 62. The back side of the conventional lower guide plate is a flat surface, and the flat surface is provided with the document press plate 73 via the sponge member 72. In contrast thereto, on the back side of the lower guide plate 62 of this embodiment, protrusion pieces 71 protruding downward are provided in at least four corners. By providing the protrusion pieces 71, it is possible to mount in a stable state without the document press plate 73 is displaced on the platen 7, while there is no fear that the platen 7 surface is scratched. Further, since the protrusion pieces 71 are provided in positions corresponding to the spacer pieces 67 provided to reserve the space of the second switchback path 46, the weight of the upper guide plate 61 is directly imposed on the protrusion pieces 71, and it is thereby possible to more stabilize the document press plate 73. In addition, the sponge member 72 is formed slightly widely in the shape of a rectangle or circle around the portion in which the protrusion pieces 71 are provided as the center, and it is thereby possible to enhance adhesion with the document press plate 73.

Figure 5:
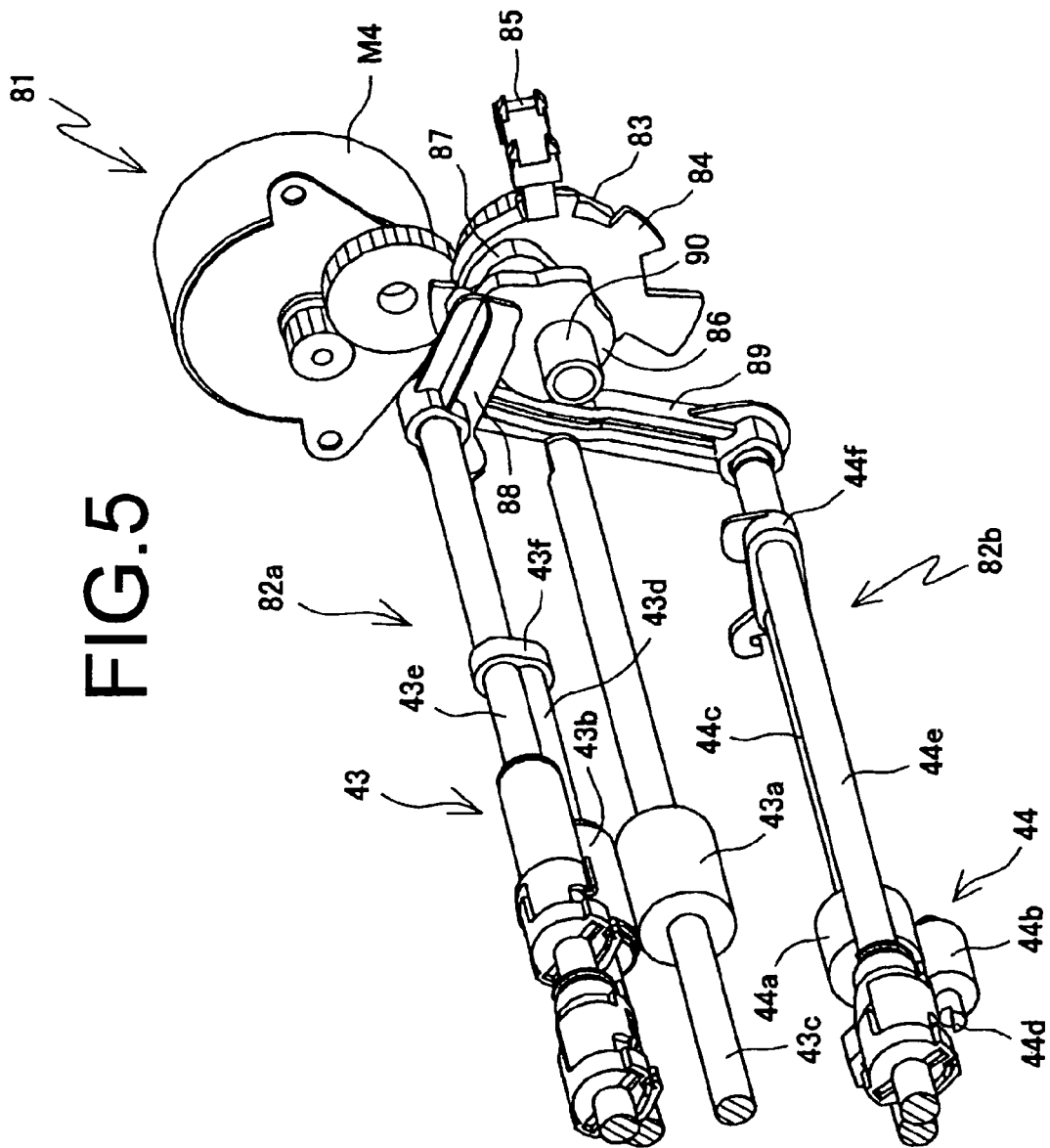
FIG. 5 is a perspective view showing a configuration of separation/contact switching means for separating and bringing in press-contact in first and second switchback roller pairs.

Further, the separation/contact switching means 81 is described herein. FIG. 5 is a perspective view showing a configuration of the separation/contact switching means 81. The separation/contact switching means 81 is comprised of first separation/contact means 82*a* and second separation/contact means 82*b* for making separation and press-contact in the first switchback roller pair 43 and the second switchback roller pair 44, a separation motor M4 for operating the first and second separation/contact means 82*a*, 82*b*, and a rotation control plate for controlling the operation of the first and second separation/contact means 82*a*, 82*b*.

The first separation/contact means 82*a* is comprised of a first cam 86 having a cam surface for separating and bringing the first switchback roller pair 43 into press-contact, and a first arm 88 for linking the first cam 86 and the first switchback roller pair 43. The second separation/contact means 82*b* is comprised of a second cam 87 having a cam surface for separating and bringing the second switchback roller pair 44 into press-contact, and a second arm 89 for linking the second cam 87 and the second switchback roller pair 44. Further, a rotation detecting sensor 85 for detecting rotation is disposed near the rotation control plate 83.

The first arm 88 is provided with a pin 88*a*, the pin 88*a* shifts along the cam surface of the first cam 86, and the first arm 88 thereby swings. Meanwhile, the second arm 89 swings while the linearly extending inner surface thereof slides along the cam surface of the second cam 87. In addition, in the first switchback roller pair 43, the driving roller 43*a* is fixed, while the driven roller 43*b* shifts to a separation position, weak-nip position, and strong nip position by the first arm 88, and in the second switchback roller pair 44, the driven roller 44*b* is fixed, while the driving roller 44*a* shifts to a separation position, or each nip position by the second arm 89.

The driven roller 43*b* of the first switchback roller pair 43 is supported in the rotary shaft 43*d* by a first support shaft 43*e* via a first couple arm 43*f*, and is coupled rotatably to the couple arm 43*f*. Then, one end of the first support shaft 43*e* is coupled to the first arm 88.

Meanwhile, the driving roller 44*a* of the second switchback roller pair 44 is supported in the rotary shaft 44*c* by a second support shaft 44*e* via a second couple arm 44*f*. Then, one end of the second support shaft 44*e* is coupled to the second arm 89.

Figure 6:
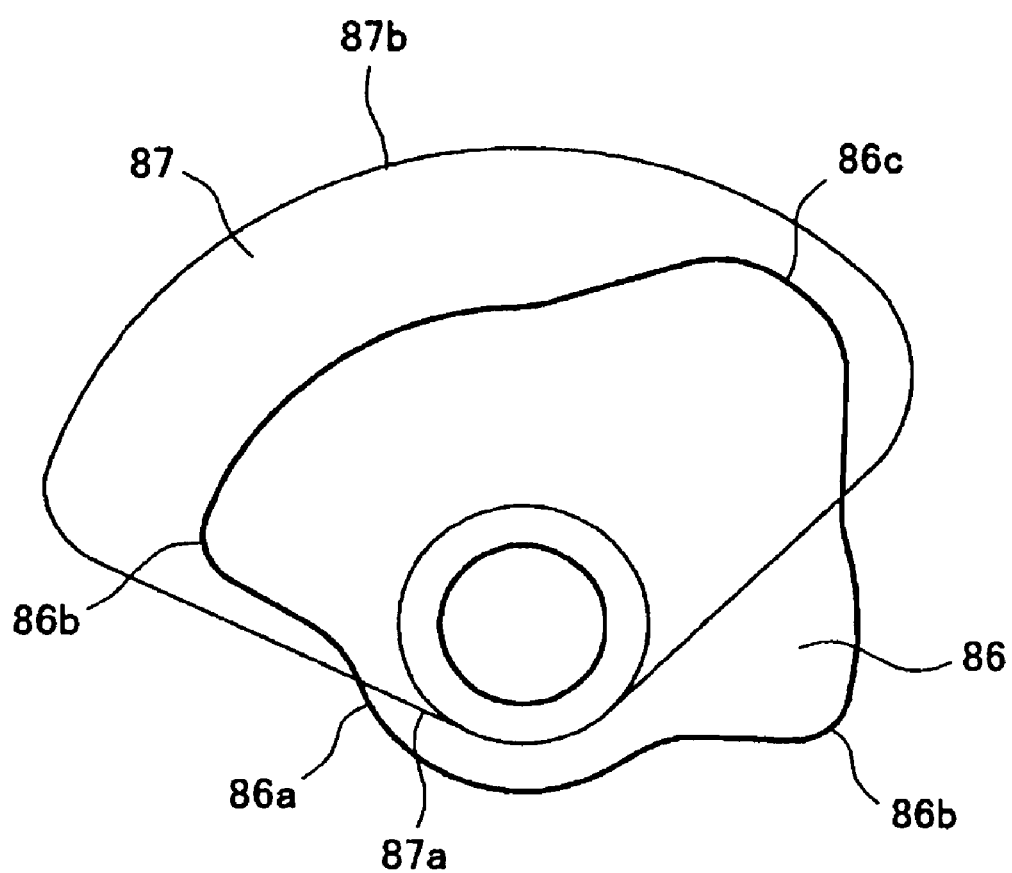
FIG. 6 is a cross-sectional view showing cam shapes of first and second cams of the separation/contact switching means.

FIG. 6 is a cross-sectional view to explain the cam shapes of the first and second cams 86, 87. As shown in FIG. 6, in the outer circumference of the first cam 86 are formed a first cam surface 86*a* to separate the first switchback roller pair 43, second cam surfaces 86*b* in two places to reduce the press-contact force of the first switchback roller pair 43, and a third cam surface 86*c* to increase the press-contact force. Further, in the outer circumference of the second cam are formed a fourth cam surface 87*a* to separate the first switchback roller pair 43, and a fifth cam surface 87*b* to bring the roller pair 43 into press-contact.

FIG. 7 contains state diagrams illustrating the press-contact state of the first cam 86 and the second cam 87 between the first and second arms 88, 89, and FIG. 8 is a chart diagram illustrating the relationship between the rotation angles of the cams and press-contact/separation state of the first and second switchback roller pairs. The press-contact and separation operation of the first and second switchback roller pairs by the separation/contact switching means 81 will be described based on FIGS. 7 and 8.

FIG. 7(*a*) shows a state in which the angles of the first and second cams 86, 87 are shifted in the range of 0 degree to 30 degrees. At this point, the first arm 88 comes into contact with the first cam surface 86*a* of the first cam 86, and the second arm 89 comes into contact with the fourth cam surface 87*a* of the second cam 87. Then, by this means, both of the first switchback roller pair 43 and the second switchback roller pair 44 are separated.

FIG. 7(*b*) shows a state in which the angles of the first and second cams 86, 87 are shifted in the range of 90 degrees to 120 degrees. At this point, the first arm 88 comes into contact with one of second cam surfaces 86*b* in two places, and the second arm 89 comes into contact with the fifth cam surface 87*b* of the second cam 87. By this means, the first switchback roller pair 43 is separated, and the second switchback roller pair 44 is brought into press-contact.

FIG. 7(*c*) shows a state in which the angles of the first and second cams 86, 87 are shifted in the range of 150 degrees to 180 degrees. At this point, the first arm 88 comes into contact with the second cam surface 86*b* of the first cam 86, and the second arm 89 comes into contact with the fifth cam surface 87*b* of the second cam 87. Then, by this means, the first switchback roller pair 43 is brought into press-contact in the weak nip state with the low press-contact force, and the second switchback roller pair 44 is brought into press-contact.

FIG. 7(d) shows a state in which the angles of the first and second cams 86, 87 are shifted in the range of 205 degrees to 235 degrees. At this point, the first arm 88 comes into contact with the third cam surface 86c of the first cam 86, and the second arm 89 comes into contact with the fifth cam surface 87b of the second cam 87. Then, by this means, the first switchback roller pair 43 is brought into press-contact in the strong nip state with the high press-contact force, and the second switchback roller pair 44 is brought into press-contact.

FIG. 7(e) shows a state in which the angles of the first and second cams 86, 87 are shifted in the range of 300 degrees to 330 degrees. At this point, the first arm 88 comes into contact with the other one of second cam surfaces 86b in two places of the first cam 86, and the second arm 89 comes into contact with the fourth cam surface 87a of the second cam 87. Then, by this means, the first switchback roller pair 43 is brought into press-contact in the weak nip state with the low press-contact force, and the second switchback roller pair 44 is separated.

Figure 9:
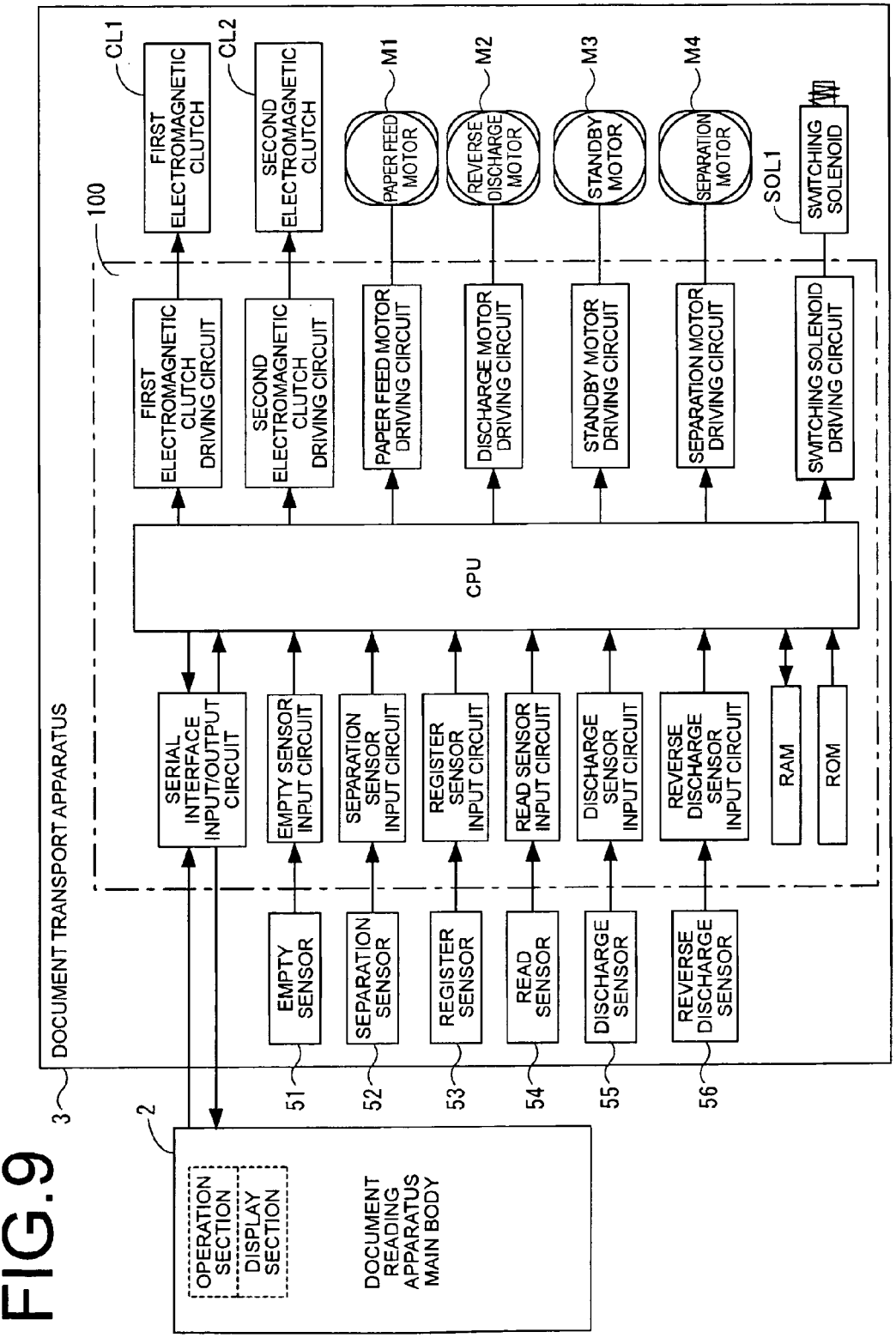
FIG. 9 is a block diagram illustrating a control system of the document transport apparatus and document reading apparatus.

Next, various sensors will be described based on control block diagrams of FIGS. 1 and 9. As shown in FIG. 1, various sensors are provided in the paths which a document sheet is passed through. In the vicinity of the feed-out roller 27 is provided an empty sensor 51 for detecting a document sheet fed from the support tray 21, and in front of the paper feed roller 28 is provided a separation sensor 52 for detecting a document sheet separated on a sheet-by-sheet basis. Further, a register sensor 53 and a read sensor 54 are provided in the transport path on the upstream side of the first contact glass 6, and a discharge sensor 55 and reverse discharge sensor 56 are provided in the transport path on the downstream side. Each of the sensors detects the presence or absence of a document sheet, and a front end and rear end of the document sheet. Then, a control section 100 having a CPU controls each actuator described below based on a document sheet detection signal from each of the sensors, and executes the transport operation of the document sheet.

The driving system is provided with a paper feed motor M1, a reverse discharge motor M2 and standby motor M3 for driving rotation to transport the document sheet, and a separation motor M4 for separating and press-contacting the first switchback roller pair 43 and the second switchback roller pair 44.

As shown in FIG. 2, the paper feed motor M1 drives the paper feed roller 28, the driving roller 30a of the register roller pair 30, the driving roller 32a of the first read roller pair 32, and the driving roller 33a of the second read roller pair 33. Further, the motor M1 is connected to the paper feed roller 28 and the driving roller 30a of the register roller pair 30 via electromagnetic clutches CL1, CL2. This motor M1 drives rotation of each roller so as to transport a document sheet toward the first platen glass 6, and it is possible to control the paper feed roller 28 and the driving roller 30a of the register roller pair 30 to be halted and driven at predetermined timing using the electromagnetic clutches CL1, CL2. The motor M2 rotates forward or backward or halts the driving roller 43a of the first switchback roller pair 43, and the driving roller 44a of the second switchback roller pair 44. Further, the motor M3 drives the driving roller 48a of the standby roller pair 48.

Further, the separation motor M4 is coupled to the first cam 86, second cam 87 and rotation control plate 83 via gears. By controlling driving and halt of the motor M4, the first cam 86 and the second cam 87 are shifted to predetermined positions. Furthermore, a switching solenoid SOL1 rotates the rotary shaft 36 of the switching flapper 34, and controls switching between positions of the switching flapper 34 so as to guide a document sheet to either the first switchback path 45 or the second switchback path.

Figure 10:
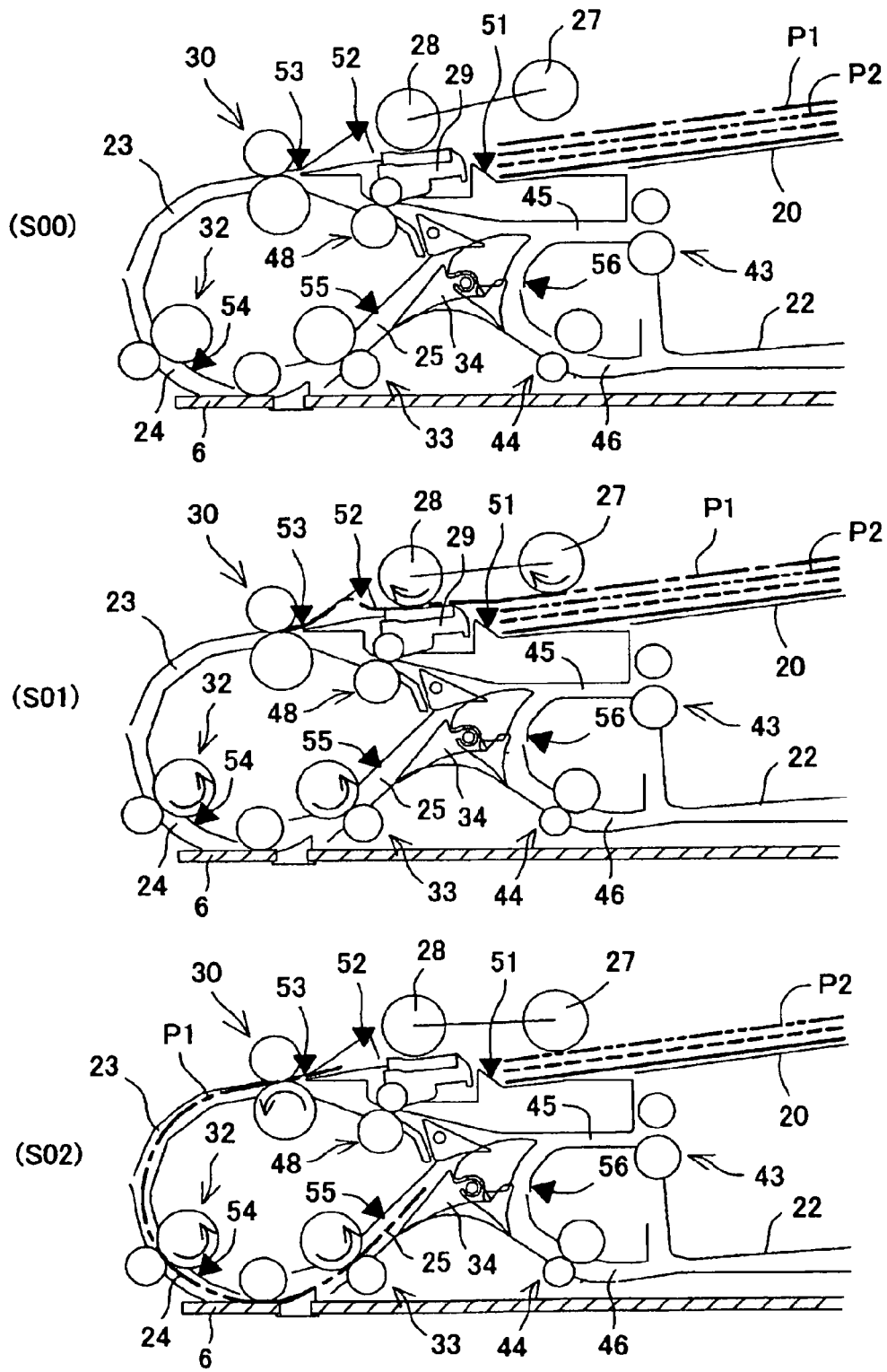
FIG. 10 contains schematic views illustrating document transport operation of two-sided document sheets.

FIGS. 10 to 19 are schematic views illustrating the document transport operation in reading two-sided document sheets. The transport operation for two-sided document sheets will be described based on the schematic views. As shown in FIG. 10 (S00), when the empty sensor 51 detects from a state in which document sheets are mounted on the paper feed tray 20, the paper feed motor M1 is driven, and the electromagnetic CL1 is switched ON. By this means, the feed-out roller 27 and paper feed roller 28 are driven to rotate, and the uppermost document sheet P1 mounted on the paper feed tray 20 is fed out, and is separated as a single document sheet P1 by the separation pad 29. In addition, when a two-sided document read mode is selected in the initial operation in starting feeding of the document sheets, the first switchback roller pair 43 is separated, and the second switchback roller pair 44 is brought into press-contact (see FIG. 7(b)). Further, the switching flapper 34 is switched to a position for opening the sheet discharge path 25 to guide the sheet to the first switchback path 45, and blocking the path toward the second switchback path 46.

When the register sensor 53 detects a front end of the sheet 21 passed through the separation pad 29, after transporting the sheet 91 by a predetermined amount from the detection time, the electromagnetic clutch CL1 is switched OFF, and the feed-out roller 27 and paper feed roller 28 are halted. By this means, as shown in FIG. 10 (S01), the front end of the sheet P1 strikes the press-contact portion of the register roller pair 30 and is aligned, and the skew is removed.

Subsequently, the electromagnetic clutch CL2 is switched ON, and the register roller pair 30 is driven to rotate in a counterclockwise direction. Then, as shown in FIG. 10 (S02), the sheet 21 is transported along the read path 24 extending in the shape of a U by the driven first and second read roller pairs 32, 33, and is passed through above the first contact glass 6 with the front side and back side reversed. The front side of the sheet 21 is read in passing through above the first contact glass 6.

Figure 11:
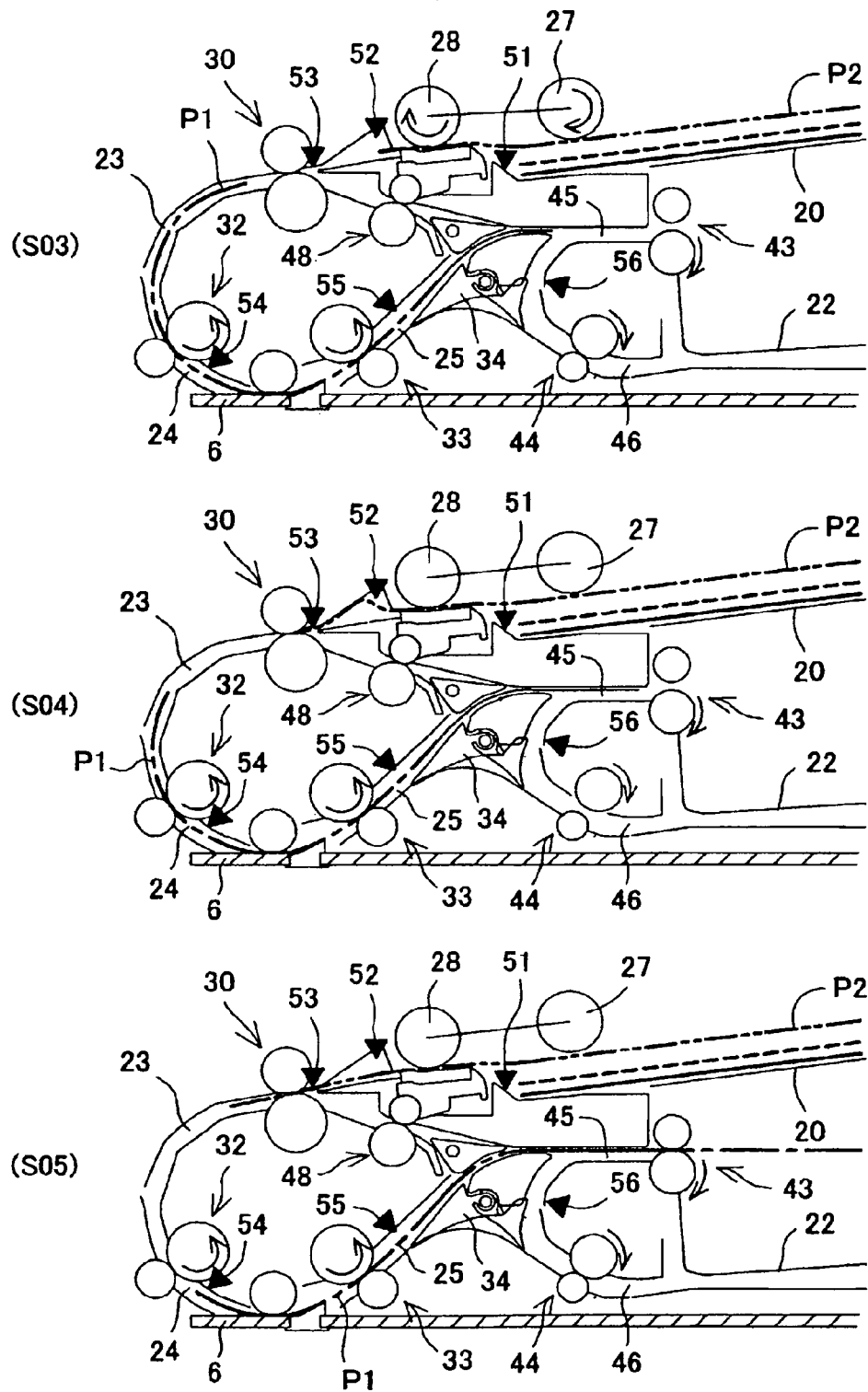
FIG. 11 contains schematic views illustrating the document transport operation of two-sided document sheets continued from FIG. 10.

The sheet P1 passed through the first contact glass 6 is guided to the first switchback path 45 via the switching flapper 34. Then, when the front end portion of the sheet P1 is detected by the discharge sensor 55, the reverse discharge motor M2 is driven to rotate forward. For a period during which the front end portion of the first sheet P1 is guided to the first switchback path 45, when the rear end portion is detected by the separation sensor 52, the electromagnetic clutch CL1 is switched ON, and as shown in FIG. 11 (S03), feeding of a second document sheet P2 is started by the feed-out roller 27 and paper feed roller 28. Meanwhile, when the register sensor 53 detects the rear end portion of the sheet P1, the second electromagnetic clutch CL2 is switched OFF, the register roller pair 30 is halted, and the sheet P2 strikes the press-contact portion of the halted register roller pair 30 and is aligned. Subsequently, the electromagnetic clutch CL1 is switched OFF, and the sheet P2 is halted with the sheet P2 striking the press-contact portion of the register roller pair 30 as shown in FIG. 11 (S04).

Then, after a lapse of a predetermined time from the time the electromagnetic clutch CL1 is switched OFF, the electromagnetic clutch CL2 is switched ON. By this means, as shown in FIG. 11 (S05), the register roller pair 30 is driven to feed the sheet P2 toward the first contact glass 6. In addition, the above-mentioned predetermined time is a beforehand determined time to keep a distance between the previously fed sheet P1 and the sheet P2 constant. Meanwhile, when the read sensor 54 detects the rear end of the sheet P1, the separation/contact switching means 81 is switched to the state of FIG. 8(c), and the first switchback roller pair 43 undergoes the weak nip. By this means, the first switchback roller pair 43 is driven to rotate with the driving roller 43a and driven roller 43b of the first switchback roller pair 43 coming into press-contact with each other, and the sheet P1 is further transported to the sheet discharge tray 22 side.

Figure 12:
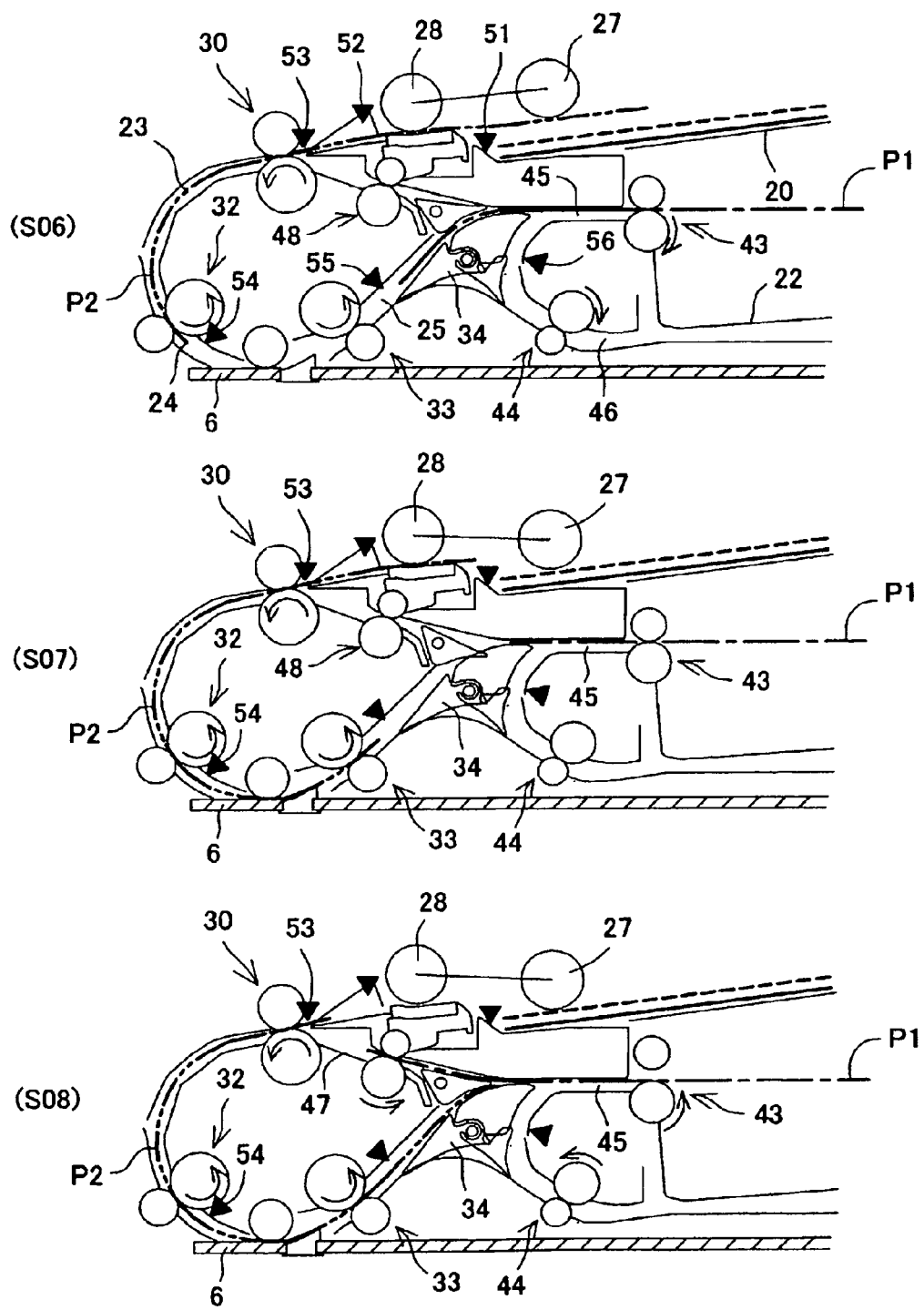
FIG. 12 contains schematic views illustrating the document transport operation of two-sided document sheets continued from FIG. 11.

As shown in FIG. 12 (S06), for a period during which the sheet P2 is transported toward the first contact glass 6, with respect to the sheet P1 passed through the first contact glass 6, the reverse discharge motor M2 is halted at the time a predetermined time has elapsed since the rear end portion of the sheet P1 is detected by the discharge sensor 55. By this means, as shown in FIG. 12 (S07), the sheet P1 stops while being nipped by the first switchback roller pair 43. Subsequently, the reverse discharge motor M2 is driven backward, and the first switchback roller pair 43 is driven to rotate backward. By this means, the sheet P1 is switched back, transported in the direction opposite to the sheet discharge direction, and guided to the re-transport path 47.

Figure 13:
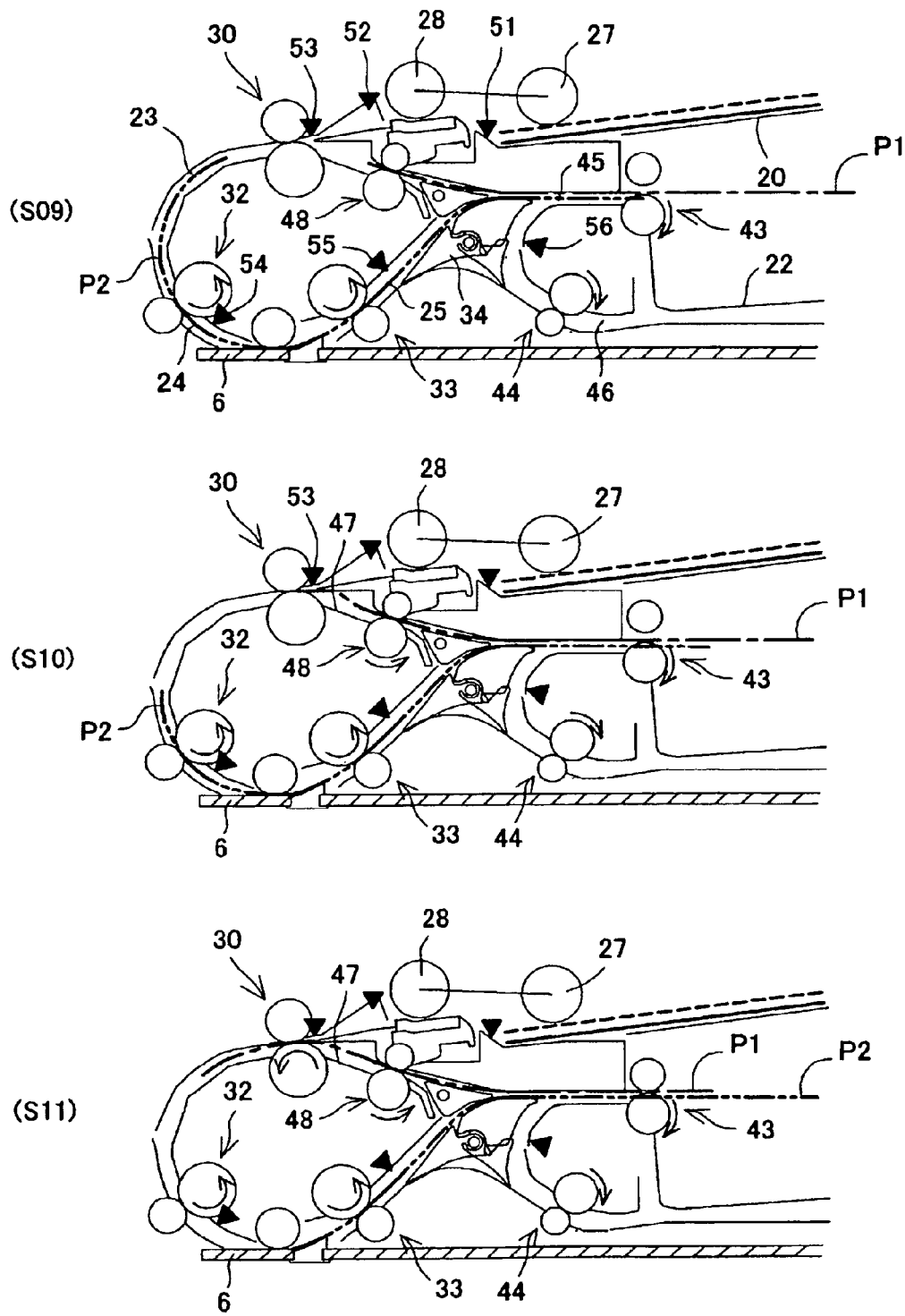
FIG. 13 contains schematic views illustrating the document transport operation of two-sided document sheets continued from FIG. 12.

The standby motor M3 is driven concurrently with driving the reverse discharge motor M2 backward, and drives the standby roller 48 to rotate. Then, as shown in FIG. 12 (S08), the standby motor M3 is halted after the front end portion of the sheet P1 is nipped by the standby roller pair 48 being driven to rotate, and the sheet P1 is thereby once halted. When the sheet P1 is nipped and held by the standby roller pair 48 and halted, the separation/contact switching means 81 is switched to the state of FIG. 7(b), and separates the driven roller 43b from the driving roller 43a. Further, the reverse discharge motor M2 is switched from the backward-rotation driving to the forward-rotation driving to rotate the driving roller 43a in the sheet discharge direction. In this state, as shown in FIG. 13 (S09), the sheet P2 passed through the first contact glass 6 is guided to the first switchback path 45, and fed in the sheet discharge direction while coming into contact the lower surface of the halted sheet P1. In addition, at this point, since the first switchback roller pair 43 is separated, the front end portion of the sheet P2 is fed in the sheet discharge direction inside the first switchback path 45 without any trouble. Further, since the driving roller 43a of the separated first switchback roller pair 43 is driven to rotate forward, the sheet P2 is provided with transport force caused by coming into contact with the driving roller 43a, and is fed smoothly.

When the sheet P2 is passed through the register sensor 53, the electromagnetic clutch CL2 is switched OFF, and the standby motor M3 is driven after a lapse of a predetermined time from the time the rear end portion of the sheet P2 is detected by the register sensor 53. By this means, as shown in FIG. 13 (S10), the front end of the sheet P1 halted on the re-transport path 47 is fed to come into contact with the register roller pair 30. During the period, by forward-rotation driving of the first read roller pair 32, second read roller pair 33 and first switchback roller pair 43, the sheet P2 is transported on the first switchback path 45 to pass the sheet P1. At this point, with the first switchback roller pair 43 separated, the sheet P1 and the sheet P2 are transported in the mutually different directions on the first switchback path 45. Then, the rear end portion of the sheet P2 is detected by the read sensor 54, the separation/contact switching means 81 is switched to the state of FIG. 7(c) after a lapse of a time during which the rear end portion of the sheet P2 arrives at the read position of the first contact glass 6, and the driven roller 43b is nipped weakly by the driving roller 43a. By this means, as shown in FIG. 13 (S11), the first switchback roller pair 43 comes into press-contact with the overlapping sheet P1 and sheet P2, and in this state, the sheet P1 and the sheet P2 are transported in the mutually opposite directions on the first switchback path 45. At this point, since the coefficient of friction of the driving roller 43a is set to be higher than the coefficient of friction between the sheets, the sheet P1 nipped by the driving roller 43b and the sheet P2 is fed toward the first contact glass 6 by the standby roller 48, register roller pair 30 and first read roller pair 43, while the sheet P2 nipped by the driving roller 43a and the sheet P1 is fed in the sheet discharge direction against the transport force of the sheet P1 by the driving roller 43a.

Then, as shown in FIGS. 14 (S12), 14 (S13) and 15 (S14), the reverse discharge motor M2 is switched from the forward-rotation driving to the backward-rotation driving after a predetermined time has elapsed since the rear end portion of the sheet P2 is detected by the discharge sensor 55. By this means, the first switchback roller pair 43 is driven to rotate backward from the forward-rotation driving, and the sheet P2 is switched back. At this point, the rear end portion of the sheet P1 has passed through the nip position of the first switchback roller pair 43, and does not affect the switchback operation of the sheet P2. The switched-back sheet P2 is transported along the re-transport path, and when the sheet P2 is nipped by the standby roller pair 48, the standby motor M3 is halted to cause the sheet P2 to wait.

Meanwhile, when the front end portion of the sheet P1 is detected by the read sensor 54 in FIG. 14 (S11), the switching flapper 46 is switched to a position for blocking the sheet discharge path 25 while opening the second switchback path 46. Then, in the first sheet P1, after the back side is read, as shown in FIG. 15 (S14), the front end portion is guided to the second switchback path 46.

In addition, when the front end portion of the sheet P1 is detected by the read sensor 54, the separation/contact switching means 81 is switched to the state of FIG. 7(e), and separates the second switchback roller pair 44. Further, when the front end portion of the sheet P2 is nipped by the standby roller 48, the means 81 is switched to the state of FIG. 7(a), and separates the first and second switchback roller pairs 43, 44.

Figure 15:
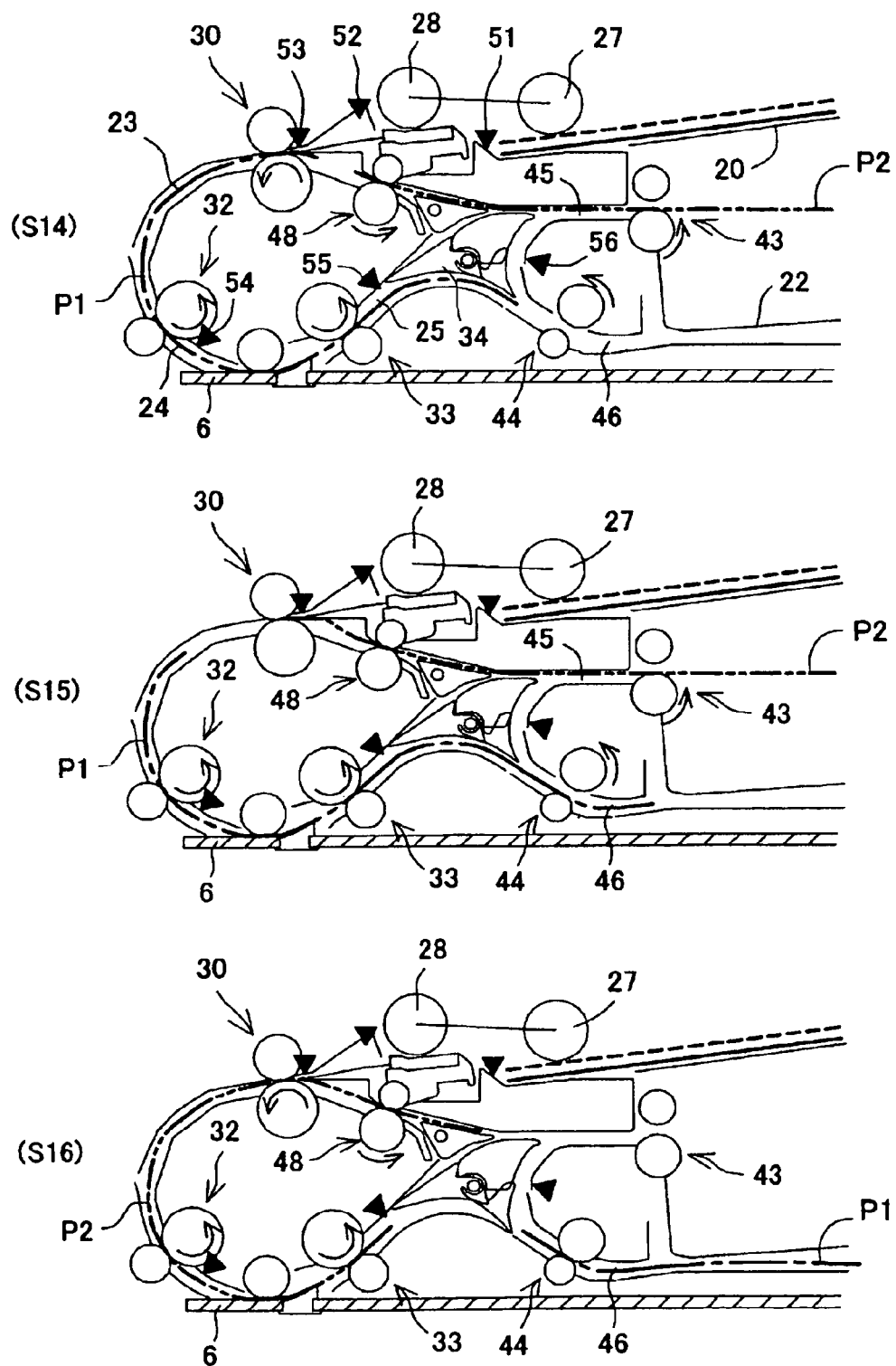
FIG. 15 contains schematic views illustrating the document transport operation of two-sided document sheets continued from FIG. 14.

For the sheet P2 waiting while being nipped by the standby roller pair 48, after the rear end portion of the sheet P1 is detected by the register sensor 53, the standby motor M3 is driven, the sheet P2 comes into contact with the halted register roller pair 30 as shown in FIG. 15 (S15), and the front end is aligned. Then, by switching the electromagnetic clutch CL2 ON, the register roller pair 30 is driven to rotate, and the sheet is re-transported toward the contact glass 6.

At the time the rear end of the sheet P1 is detected by the read sensor 54 and is passed through the read position of the contact glass 6, the separation/contact switching means 81 is switched to the state of FIG. 7(b), and brings the second switchback roller pair 44 into press-contact. Then, when the rear end portion of the sheet P1 is detected by the discharge sensor 55, after a lapse of a predetermine time from the detection, the reverse discharge motor M2 is once halted from the backward-rotation driving. By this means, as shown in FIG. 15 (S16), the sheet P1 stops in the second switchback path 44. Subsequently, the reverse discharge motor M2 is driven to rotate forward, and the second switchback roller pair 44 is rotated forward. By this means, the sheet P1 is switched back, and as shown in FIG. 16 (S17), guided to the first switchback path 45 via the reverse sheet discharge path 49. Then, the sheet P1 is fed onto the sheet discharge tray 22 by the first switchback roller pair 43.

Meanwhile, the sheet P2 is transported to the contact glass 6 subsequent to the sheet P1 to read the back side, and is transported toward the second switchback path 46. Then, as shown in FIG. 16 (S18), the separation/contact switching means 81 is switched to the state of FIG. 7(e) after a predetermined time has elapsed since the discharge sensor 55 detects the front end portion of the sheet P2, and the second switchback roller pair 44 is separated. The sheet P2 guided to the second switchback path 46 is transported so that sheet P1 and the sheet P2 pass each other on the second switchback path 46 as shown in FIG. (S19).

When the sheet P1 is discharged to the sheet discharge tray 22, the reverse discharge motor M2 is switched from the forward-rotation driving to the backward-rotation driving. By this means, as shown in FIG. 17 (S20), the second switchback roller pair 44 is switched from the forward-rotation driving to the backward-rotation driving. Then, as shown in FIG. 17 (S21), at the time the rear end portion of the sheet P2 is passed through the read position of the contact glass 6, the separation/contact switching means 81 is switched to the state of FIG. 7(c), and brings the second switchback roller pair 44 into press-contact.

At this point, a third document sheet P3 on the paper feed, tray 20 is fed out by the feed-out roller 27 as in the first sheet P1 and second sheet P2 when the rear end portion of the second sheet P2 is detected by the register roller 53, and is separated and fed by the paper feed roller 28 and separation pad 29. Then, the sheet P3 is transported toward the contact glass 6 by the register roller pair 30 and first read roller pair 32 subsequent to the sheet P2.

Figure 18:
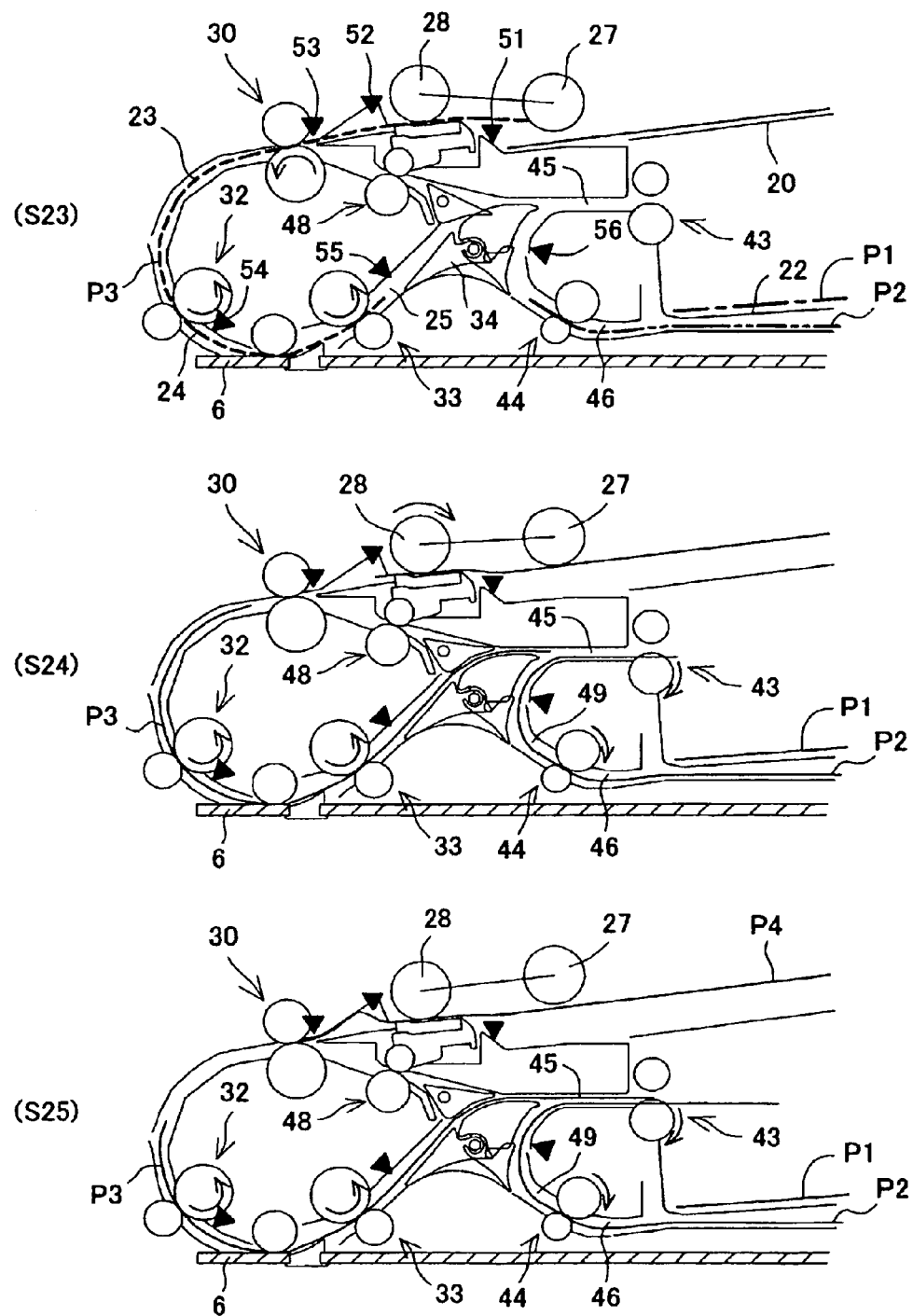
FIG. 18 contains schematic views illustrating the document transport operation of two-sided document sheets continued from FIG. 17.

Subsequently, as shown in FIG. 17 (S22), when the rear end portion of the sheet P2 is detected by the discharge sensor 55, after a lapse of a predetermined time from the detection, the reverse discharge motor M2 is halted from the backward-rotation driving. By this means, as shown in FIG. 18 (S23), the sheet P2 stops in the second switchback path 44. Further, concurrently with the halt of the reverse discharge motor M2, the separation/contact switching means 81 is switched to the state of FIG. 7(c), and the first switchback roller pair 43 is separated. At this point, when the front end portion of the sheet P3 is detected by the read sensor 54, the switching flapper 34 is switched to the position for opening the sheet discharge path 25 while blocking the second switchback path 46.

Then, when the reverse discharge motor M2 is driven to rotate forward, the second switchback roller pair 44 is rotated forward. By this means, the sheet P2 halted inside the second switchback path 44 is switched back, and guided to the first switchback path 45 via the reverse sheet discharge path 49. Meanwhile, the sheet P3 is transported toward the first switchback path 45 while being read on the contact glass 6. In other words, as shown in FIG. 18 (S24), the sheet P3 is guided to the first switchback path 45 after the sheet P2 is guided to the first switchback path 45, and as shown in FIG. 18 (S25), is transported in the sheet discharge direction with the sheet P3 displaced from the sheet P2 while overlapping.

At this point, the first switchback roller pair 43 is separated. Then, the sheet P3 arrives at the read position of the contact glass 6, the separation/contact switching means 81 is switched to the state of FIG. 7(d), and the driven roller 43b is brought into press-contact with the driving roller 43a by the strong nip. By this means, as shown in FIG. 19 (S26), the sheet P2 and the sheet P3 are transported in the sheet discharge direction while being nipped by the second switchback roller pair 43.

Figure 19:
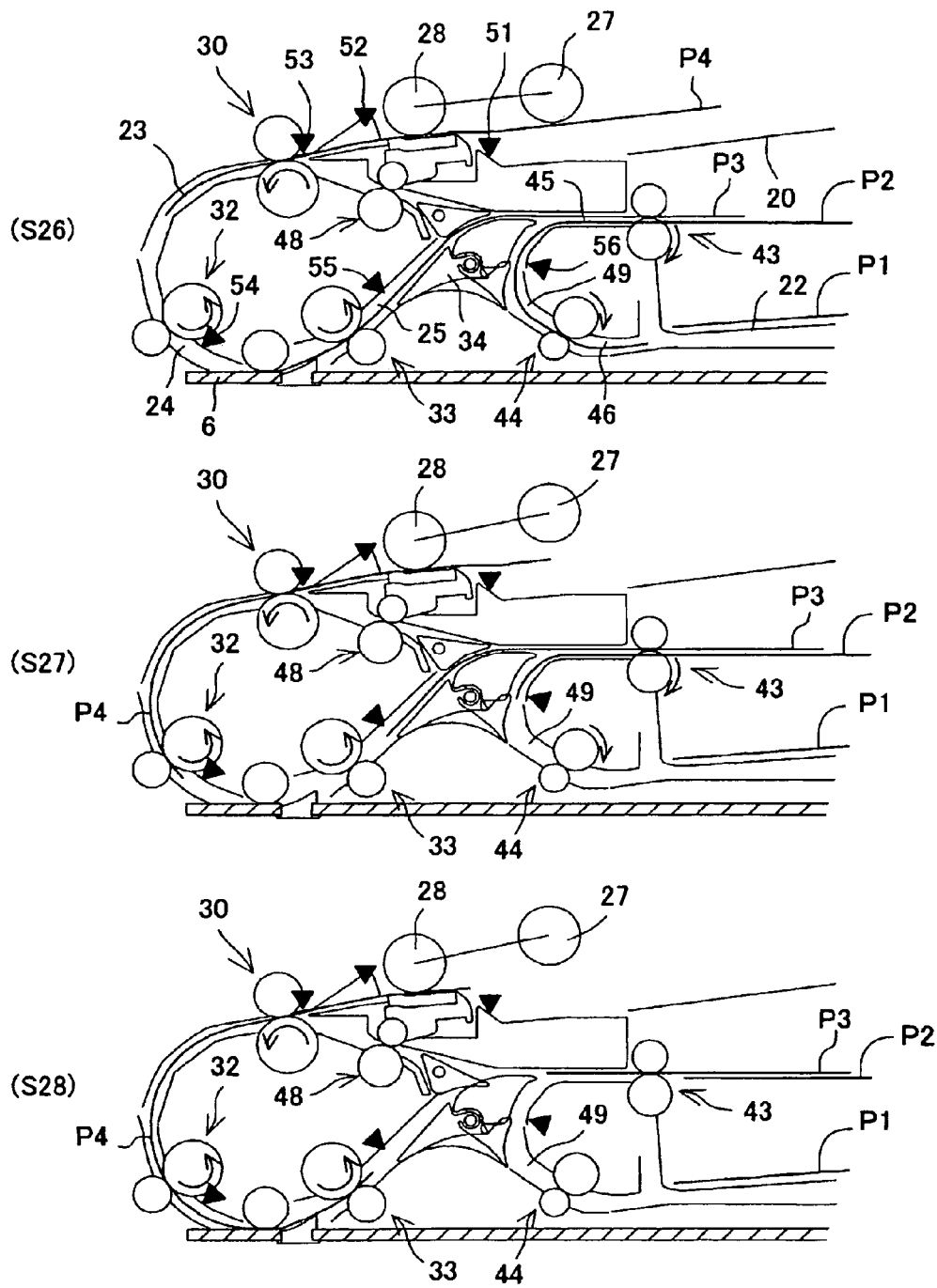
FIG. 19 contains schematic views illustrating the document transport operation of two-sided document sheets continued from FIG. 18.

Then, as shown in FIG. 19 (S27), after a lapse of a predetermined time from the time the rear end portion of the sheet P3 is detected by the discharge sensor 55, the reverse discharge motor M2 rotating forward is halted. By this means, the first switchback roller pair 43 is once halted. At this point, as shown in FIG. 19 (S28), the sheet P2 is passed through the first switchback roller pair 43 and discharged onto the sheet discharge tray 22, and the sheet P3 is halted while being nipped by the first switchback roller pair 43. Then, by driving the reverse discharge motor M2 to rotate backward from this state, the first switchback path roller pair 43 is driven to rotate backward, and the sheet P3 is switched back.

Thereafter, the same transport operation as that of the first sheet P1 is executed for the sheet P3, while the same transport operation as that of the second sheet P2 is executed for a fourth sheet P4 subsequent to the sheet P3. In other words, the sheet P3 that is switched back in the first switchback path 45 is re-transported toward the contact glass 6 after being halted in the standby roller 48. At this time, the sheet P3 and the sheet P4 of which the front side is read pass each other inside the first switchback path 45.

Herein, in a sheet discharge outlet 41 of the discharge path 25 (first switchback path 45) are provided elastic film members 90. Each of the elastic film members 90 is provided so that the second sheet passing through the first switchback roller pair 43 neither follows the switchback operation of the third sheet by static electricity, nor is drawn again to the nip portion of the first switchback roller pair 43, in discharging one of two sheets that are transported in the sheet discharge direction while overlapping and switching back the other sheet to transport, i.e. in concurrently performing the sheet discharge operation of the second sheet and the switchback operation of the third sheet as shown in FIGS. 19 (S26) and (S27).

Figure 20:
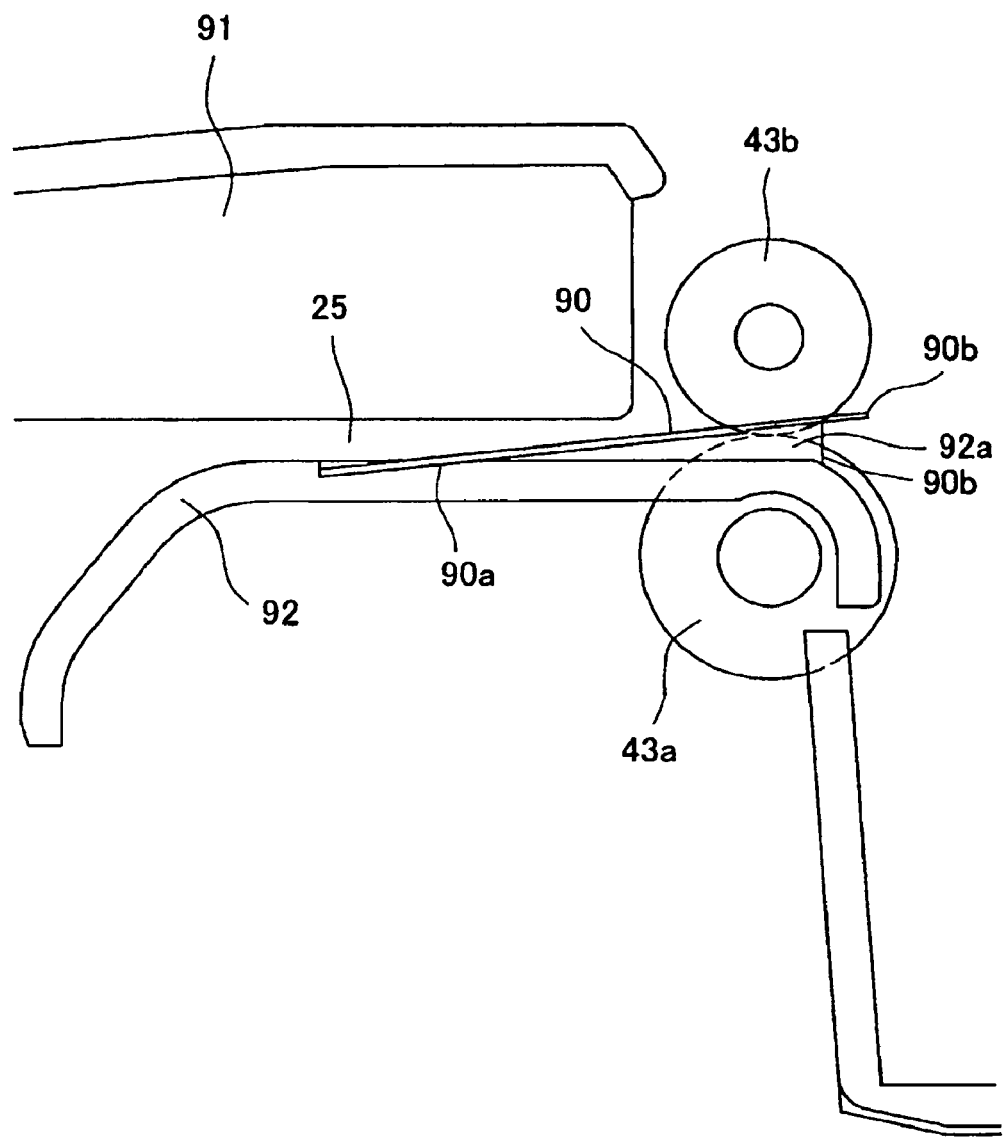
FIG. 20 is a cross-sectional view showing a configuration of a first switchback portion provided with an elastic film member for peeling.

A configuration of each of the elastic film members 90 will be described based on FIGS. 20 and 21. FIG. 20 is a cross-sectional view showing the configuration of the sheet discharge portion (first switchback portion) to discharge a document sheet onto the sheet discharge tray 22, and FIG. 21 is a perspective view of the portion. As shown in FIG. 21, the first switchback roller pair 43 is comprised of two sheet discharge driving rollers 43a attached to the rotary shaft extending in the document sheet width direction orthogonal to the document sheet discharge direction while being spaced a predetermined distance apart from each other, and two sheet discharge driven rollers 43b coming into press-contact with respective sheet discharge driving rollers 43a. Further, a plurality of protrusion portions 92a is formed in a lower guide member 92 forming the portion of the downstream side of the discharge path 25 (first switchback path 45). The protrusion portions 92a are provided on opposite outward sides of the sheet discharge driving rollers 43a and in between two sheet discharge driving rollers 43, and are formed so that top portions of the protrusion portions 92a protrude to the upper guide member 91 side more than the nip point of the first switchback roller pair 43. By thus providing the lower guide member 92 with the protrusion portions 92a, as shown in the state view of FIG. 22, the document sheet nipped by the first switchback roller pair 43 is curved in the document sheet width direction, and it is possible to discharge the sheet while providing the sheet with strength. In this embodiment, the protrusion portions 92a are formed while being inclined to the upper guide member 91 side toward the sheet discharge direction from the position lower than the document sheet transport surface of the lower guide member 92, and have sides 92b, extending in the vertical direction, in the end portions on the sheet discharge direction side.

As shown in FIGS. 20 and 21, the elastic film member 90 is provided to extend in the sheet discharge direction toward the upper guide member 91 while blocking the sheet discharge outlet 41, and one end portion 90a thereof is fixed and attached to the protrusion portion 92a of the lower guide 92, while the other end portion 90b is a free end protruding to the sheet discharge direction side more than the end portion of the protrusion portion 92a.

Figure 23A:
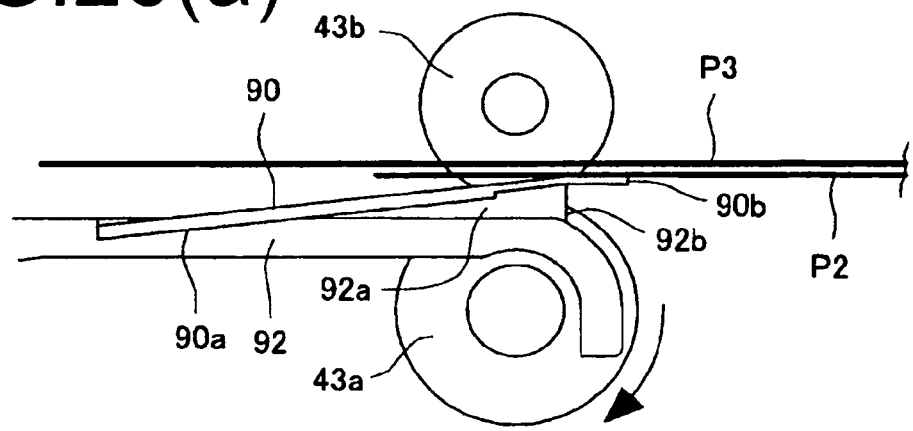
FIGS. 23(a)-23(c) contains schematic views to explain peeling action of the elastic film member for peeling.

The action of the elastic film member 90 will be described next based on schematic views of FIG. 23. As shown in FIG. 23(a), the second sheet P2 and the third sheet P3 are overlapped with the rear end of the sheet P2 displaced in the sheet discharge direction with respect to the rear end of the sheet P3, and are transported in the sheet discharge direction by the first switchback roller pair 43. At this point, two sheets P2 and P3 to be transported are provided with strength, and therefore, the free end of the elastic film member 90 bends downward by the transported two sheets P2 and P3.

Figure 23B:
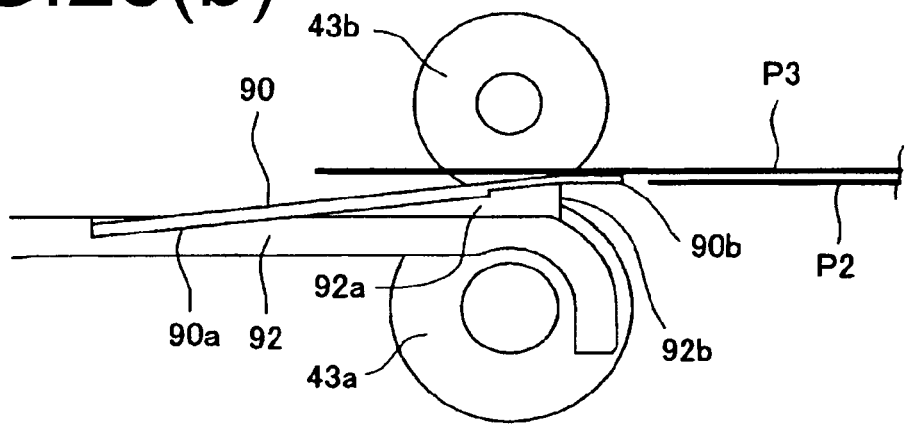

Then, in a position in which the rear end of the sheet P2 is passed through the nip portion of the first switchback roller pair 43 and is fed in the sheet discharge direction more than the free end of the elastic film member 90, the first switchback roller pair 43 is halted. At this point, as shown in FIG. 23(b), since the elastic film member 90 bends downward only by the sheet P3, the biasing force of the sheet against the elastic film member 90 is reduced. By this means, the sheet P3 is raised upward by drag of the elastic film member 90, and the sheet P2 and the sheet P3 running over the elastic film member 90 are peeled off from each other.

Figure 23C:
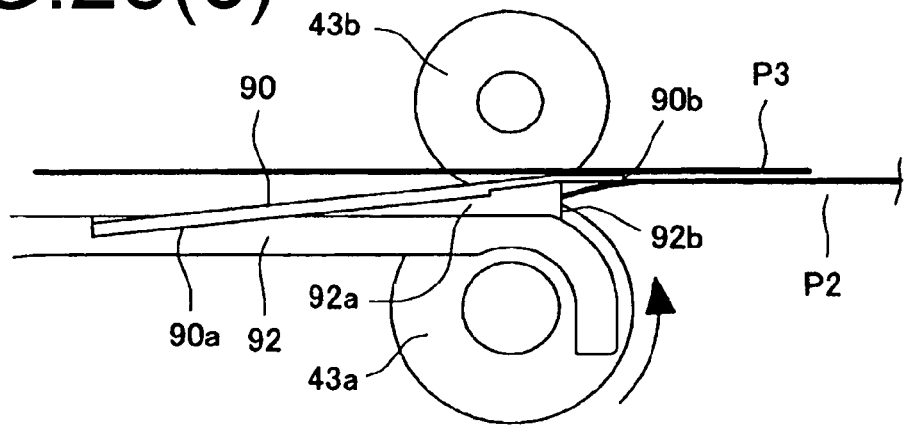

Subsequently, the first switchback roller pair 43 is driven to rotate backward, and the sheet P3 is switched back. At this point, there is fear that it is not possible to peel two sheets P2 and P3 away from each other even by the action of the elastic film members 90 due to adsorption between the sheets by static electricity and/or increases in the load amount of document sheets on the sheet discharge tray 22. In this case, the sheet P2 does not fall onto the sheet discharge tray 22, and is switched back while following the switched-back sheet P3, but as shown in FIG. 23(c), the elastic film members 90 enter in between the sheet P3 and the sheet P2, and reliably peel two sheets away from each other. In addition, the front end in the switchback direction of the peeled sheet P2 comes into contact with the sides 92b of the protrusion portions 92a of the lower guide member 92 formed under the elastic film members 90 to stop, and falls onto the sheet discharge tray 22 to be stored.

In addition, in this embodiment, the position of the free end of each of the elastic film members 90 is set based on the distance which the sheet P2 is fed by the inertial force by the first switchback roller pair 43 and the grip force of the elastic film members 90 and the sheet P3, and it is desirable that the front end of the free end portion 90b of each of the elastic film members 90 extends to the vertical position of the outer circumferential surface of the driving roller 43a of the first switchback roller pair 43.

Figure 24:
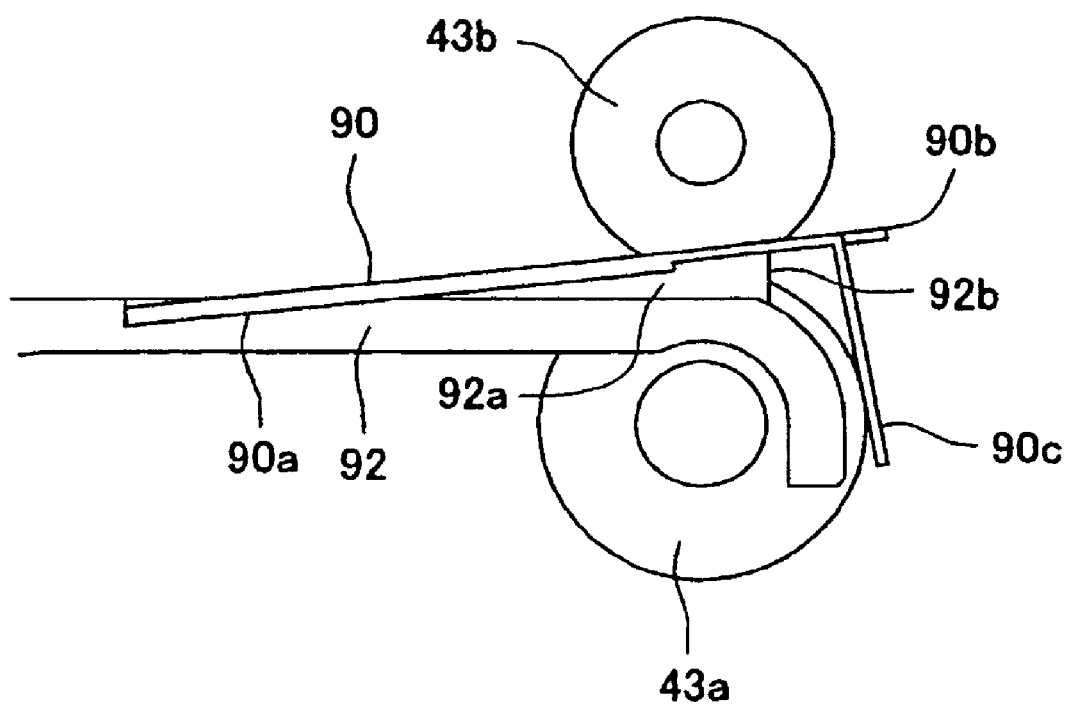
FIG. 24 is a cross-sectional view showing a modification of the elastic film member for peeling.

Further, in the above-mentioned embodiment, when the second sheet P2 is switched back while following the third sheet P3, it is configured that the sheet P2 peeled by the film members 90 comes into contact with the sides 92b of the protrusion portions 92a of the lower guide member 92, and further, as shown in the modification of FIG. 24, the free one end side 90b of each of the elastic film members 90 may be provided with a folded portion 90c hanging downward. By this means, the sheet P2 peeled by the free ends of the elastic film members 90 comes into contact with the folded portions 90c of the elastic film members 90, and is capable of being reliably dropped onto the sheet discharge tray 22 subsequently without coming into contact with the sheet discharge roller 43a.

As described above, in the document transport apparatus 3 in this embodiment, since the structure is provided with the first and second switchback paths 45, 46 enabling two document sheets to be transported while passing each other in the mutually different directions, it is made possible to perform transport and reading of both front and back sides with the distance between the prior first document sheet P1 and the subsequent second document sheet P2 reduced. Therefore, it is possible to reduce the size of the document transport apparatus 3, while speeding up continuous reading. Further, the switchback roller pairs 43, 44 provided in the first and second switchback paths 45, 46 are controlled to be able to rotate forward and backward, stop, come into press-contact and separate, and it thereby possible to transport document sheets safely and smoothly corresponding to various pass patterns.

Further, in the second switchback path 46 in this embodiment, since the upper and lower protrusion portions 65, 66 protruding inside the document pass area 68 are provided, and further, the upper and lower transport ribs 63, 64 are staggered, even when the lower guide plate 62 for pressing a fixed thick document becomes distorted and deformed, the document pass space 68 is reserved to pass the document sheet. Therefore, the lower guide plate 62 does not need to be formed of a hared or thick member that does not cause distortion and deformation unlike the conventional case, and enables a resin plate with hardness and thickness of the same extent as that of the upper guide plate 61 to be used. By this means, it is possible to reduce the size and weight of the document transport apparatus 3.

In the document transport apparatus 3 of this embodiment, it is made possible to make the force for nipping the document sheet variable between transporting two document sheets to pass each other in the mutually opposite directions, and transporting two document sheets in the same direction with the sheets overlapped in the first switchback path 45, and it is thereby possible to transport the document sheets smoothly with reliability.

Further, in the document transport apparatus 3 of this embodiment, by using the separation/contact switching means 81 comprised of the first and second cams 86, 87 integrally formed in a single motor M4, the first switchback roller pair 43 is switched to three states of separation, weak nip and strong nip, while the second switchback roller pair 44 is switched to two states of separation and press-contact, it is made ease to control a sequence or program of separation and each nip corresponding to a series of document sheet transport states, and timing deviation and the like do not occur.

According to this embodiment, the sheet discharge outlet of the discharge path is provided with the elastic film members 90 which peel the sheet P2 to be discharged onto the sheet discharge tray 22 and the sheet P3 to be switched back and fed to the first switchback path 45 away from each other, it is thereby possible to peel the sheet P2 and the sheet P3 off from each other in the simplified inexpensive configuration, and it is possible to prevent the discharge sheet from being drawn again into the path by following the switched-back sheet.

In the above-mentioned embodiment, provided is the configuration where the downstream portion of the sheet discharge path 25 and the first switchback path 45 are shared, and further, as shown in FIG. 25, the sheet discharge path and the first switchback path may be provided separately. This another embodiment will be described based on FIG. 25. In addition, for convenience, the same reference numerals are used in the drawing for components similar to those of the above-mentioned embodiment.

In another embodiment, as shown in FIG. 25, provided are a first switchback path 120 for switching back a document sheet of which one side is read to re-transport to the platen glass 6, a second switchback path 121 for switching back a document sheet of which both sides are read to transport toward the sheet discharge tray 22, and a reverse sheet discharge path 122 for reversing the document sheet that is switched back in the second switchback path 121 to discharge to the sheet discharge tray 22.

The first switchback path 120 forms a path extending from the second read roller pair 33 to a first switchback roller pair 110. At some midpoint in the first switchback path 120 is provided a first self-weight flapper 114 for guiding the switched-back sheet to the re-transport path 47. The second switchback path 121 is provided to branch off from some portion of the first switchback path 120 to extend below the sheet discharge tray 22. In the position in which the second switchback path 121 branches off from the first switchback path 120, a switching flapper 113 is provided to switch the transport direction of the document sheet to either one of the first switchback path 120 and the second switchback path 121. The reverse sheet discharge path 122 branches off from some portion of the second switchback path 121, and from the branch position, forms a curved path reaching a sheet discharge roller pair 111. In the branch position at some midpoint in the second switchback path 121, a second self-weight flapper 115 is provided to guide the document sheet that is switched back in the second switchback path 121 to the reverse sheet discharge path 122.

According to such a configuration, the first sheet P1 of which one side is read on the contact glass 6 is guided to the first switchback path 120, switched back by the first switchback roller pair 110, and fed to the re-transport path 47. At this point, the second sheet P2 is supplied to the contact glass 6 subsequent to the sheet P1 and passed through.

Figure 26A:
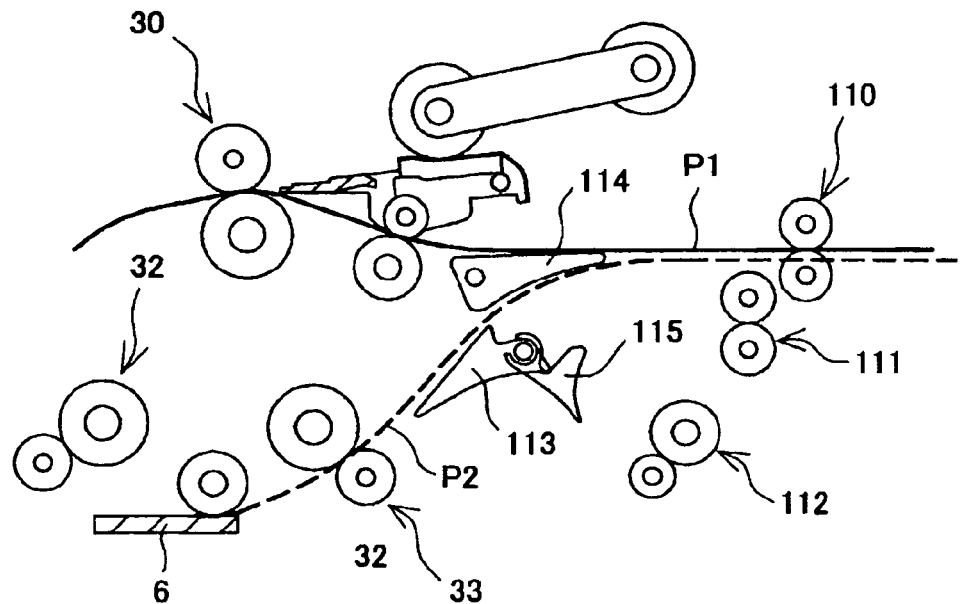
FIG. 26(a) an 26(b) contains state views showing a state in which two documents pass each other in the another embodiment.

The switched-back sheet P1 stops at the time the front end portion thereof is nipped by the standby roller pair 48. Then, after the second sheet P2 is passed through the register roller pair 30, the sheet P1 is re-transported toward the contact glass 6. At this point, as shown in FIG. 26(a), the sheet P1 and the sheet P2 overlap in the portion on the downstream side of the first switchback path 120, and are transported in the mutually different directions.

The sheet P1 to re-transport toward the contact glass 6 is guided to the second switchback path 121 by a switching flapper 120 after the front end portion thereof passes through the contact glass 6. Then, the sheet P1 is switched back by a second switchback roller pair 112 and fed to the reverse sheet discharge path 122. At this point, the second sheet P2 is switched back by the first switchback roller pair 110 as in the first sheet P1, fed to the re-transport path 47 to stop, and then, re-transported to the contact glass 6 subsequent to the sheet P1. The switched-back sheet P1 stops at the time the front end portion thereof is nipped by the standby roller pair 48.

Figure 26B:
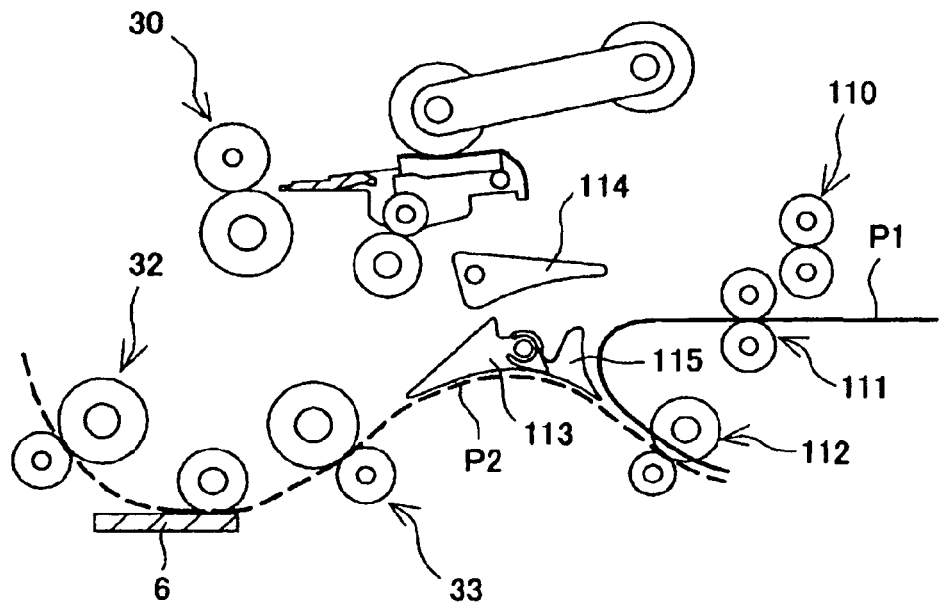

The switched-back sheet P1 is guided along the curved reverse sheet discharge path 122 while being reversed, and discharged onto the sheet discharge tray 22 by the sheet discharge roller pair 111. At this point, during discharge of the sheet P1, the sheet P2 is fed to the second switchback path 121. In other words, as shown in FIG. 26(b), the sheet P1 and the sheet P2 overlap one another in the second switchback path 120, and are transported in the mutually different directions. Then, after the sheet P1 is discharged, the sheet P2 is switched back in the second switchback path 120, and discharged onto the sheet discharge tray 22 via the reverse sheet discharge path 122 subsequent to the sheet P1.

According to this another embodiment, since two document sheets pass each other in the mutually different directions in the first and second switchback paths 120, 121, it is made possible to perform transport and reading of both front and back sides with the distance between the prior first document sheet P1 and the subsequent second document sheet P2 reduced, and it is possible to shorten the reading processing time of document sheets.

In addition, this application claims priority from Japanese Patent Application No. 2009-258782, Japanese Patent Application No. 2009-299179, Japanese Patent Application No. 2010-040877, Japanese Patent Application No. 2010-040880, and Japanese Patent Application No. 2010-043287 incorporated herein by reference.

What is claimed is:

1. A document transport apparatus for transporting a document sheet to a predetermined position to read the document sheet, comprising:
a paper feed tray to mount document sheets;
a document reading portion for reading both sides of each of the document sheets;
transport means for transporting the document sheets on the paper feed tray to the document reading portion;
a sheet discharge tray to store the document sheets of which both sides are read;
a first switchback portion for switching back each of the document sheets of which the front side is read in the document reading portion to transport again to the document reading portion;
a second switchback portion for switching back each of the document sheets of which both sides are read in the document reading portion to discharge to the sheet discharge tray;
first switchback means provided in the first switchback portion to transport two document sheets in mutually different directions, the first switchback means having a first switchback path and a first switchback roller pair each for guiding overlapping two document sheets in the mutually different directions or the same direction;
nip force switching means for switching a nip force to nip a document sheet of the first switchback roller pair; and
second switchback means provided in the second switchback portion to transport two document sheets in mutually different directions.

2. The document transport apparatus according to claim 1, further comprising:
a sheet discharge outlet provided at an end on the downstream side of the first switchback path to discharge each of the document sheets to the sheet discharge tray,
wherein the first switchback roller pair discharges one of the overlapping two document sheets fed in the same direction onto the sheet discharge tray from the sheet discharge outlet, while switching back the other one of the sheets in a portion on the downstream side of the first switchback path to transport.

3. The document transport apparatus according to claim 2, further comprising:
a plate-shaped peeling member provided in the sheet discharge outlet,
wherein the plate-shaped peeling member is fixed at one end side thereof to one of guides forming the first switchback path, while extending at the other end side thereof toward the downstream side of the first switchback roller pair so as to block the sheet discharge outlet.

4. The document transport apparatus according to claim 1, wherein the first switchback means has a first switchback roller pair for transporting each of the document sheets guided to the first switchback portion, and the second switchback means has a second switchback roller pair for transporting each of the document sheets to the first switchback portion.

5. The document transport apparatus according to claim 4, further comprising:
a separation/contact mechanism that makes each of the first switchback roller pair and the second switchback roller pair separate and come into press-contact.

6. The document transport apparatus according to claim 5, further comprising a single actuator that actuates the separation/contact mechanism.

7. A document transport apparatus for transporting a document sheet to a predetermined position to read the document sheet, comprising:
a paper feed tray to mount document sheets;
a document reading portion for reading both sides of each of the document sheets;
transport means for transporting the document sheets on the paper feed tray to the document reading portion;
a sheet discharge tray to store the document sheets of which both sides are read;
a first switchback portion for switching back each of the document sheets of which the front side is read in the document reading portion to transport again to the document reading portion;
a second switchback portion provided below the first switchback portion to switch back each of the document sheets of which both sides are read in the document reading portion to transport toward the sheet discharge tray;
a first switchback path provided in the first switchback portion to guide a document sheet that is transported from the first switchback portion to the document reading portion and another document sheet that is transported from the document reading portion to the first switchback path in mutually different directions with the document sheet and the another document sheet overlapping;
a first switchback roller pair disposed in the first switchback path to switch back the document sheet to transport, while discharging the document sheet to the sheet discharge tray;
a second switchback path provided in the second switchback portion to guide a prior document sheet that is transported from the second switchback portion to the sheet discharge tray and a subsequent document sheet that is transported from the document reading portion to the second switchback portion in the mutually different directions with the prior document sheet and the subsequent document sheet overlapping; and
control means for controlling transport of the document sheets so that two document sheets are transported to the document reading portion in an order of the front side of the prior document sheet and the front side of the subsequent document sheet, the two document sheets of which front sides are read are switched back by first switchback means, and then re-transported to the document reading portion in an order of the back side of the prior document sheet and the back side of the subsequent document sheet, and that the two document sheets of which both sides are read are switched back sequentially by second switchback means to discharge to the sheet discharge tray,
wherein the first switchback path guides the document sheet that is transported from the second switchback portion to the first switchback portion and the document sheet that is transported from the document reading portion to the first switchback portion in the same direction with the document sheets overlapping, and
the first switchback roller pair nips two document sheets to enable the sheets to be transported in the mutually different directions, while transporting two sheets in the same direction while nipping the sheets.

8. The document transport apparatus according to claim 7, further comprising:
nip force switching means for switching a press-contact force of the first switchback roller pair,
wherein the nip force switching means sets a second press-contact force for nipping two document sheets transported in the same direction to be larger than a first press-contact force for nipping two document sheets transported in the mutually different directions.

9. The document transport apparatus according to claim 7, further comprising:
a first switchback roller pair for transporting two overlapping document sheets in the same direction in the first switchback path with the two document sheets displaced in the document transport direction,
wherein the first switchback roller pair discharges one of the two document sheets transported in the same direction to the sheet discharge tray, while switching back the other one of the sheets to transport.

10. The document transport apparatus according to claim 9, further comprising:
a peeling member provided in a sheet discharge outlet formed in the first switchback path,
wherein the peeling member peels the one of the two document sheets, which moves while following the other one of the sheets that is switched back by the first switchback roller pair downstream in the sheet discharge direction of the first switchback roller, away from the other one of the sheets to store on the sheet discharge tray.

11. The document transport apparatus according to claim 7, further comprising:
a first switchback roller pair disposed in the first switchback path to transport each of the document sheets;
a second switchback roller pair disposed in the second switchback path to transport each of the document sheets;
a separation/contact mechanism that makes each of the first switchback roller pair and the second switchback roller pair separate and come into press-contact; and
a single actuator that actuates the separation/contact mechanism.

* * * * *